(12) United States Patent
Sharma et al.

(10) Patent No.: US 12,191,974 B2
(45) Date of Patent: Jan. 7, 2025

(54) MULTI TRANSMISSION RECEPTION POINT (TRP) SYSTEM AND METHOD THEREOF

(71) Applicant: Samsung Electronics Co., Ltd., Suwon-si (KR)

(72) Inventors: Neha Sharma, Bangalore (IN); Anshuman Nigam, Bangalore (IN); Anand Madhavrao Baswade, Bangalore (IN); Vikalp Mandawaria, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/698,541

(22) Filed: Mar. 18, 2022

(65) Prior Publication Data

US 2022/0302994 A1 Sep. 22, 2022

Related U.S. Application Data

(63) Continuation of application No. PCT/KR2022/003751, filed on Mar. 17, 2022.

(30) Foreign Application Priority Data

Mar. 18, 2021 (IN) .............................. 202141011652
Feb. 7, 2022 (IN) .............................. 202141011652

(51) Int. Cl.
*H04B 7/15* (2006.01)
*H04B 7/06* (2006.01)
(Continued)

(52) U.S. Cl.
CPC ....... *H04B 7/15507* (2013.01); *H04B 7/0626* (2013.01); *H04W 48/16* (2013.01);
(Continued)

(58) Field of Classification Search
CPC . H04B 7/15507; H04B 7/0626; H04W 76/15; H04W 48/16; H04W 48/20; H04W 56/001
See application file for complete search history.

(56) References Cited

U.S. PATENT DOCUMENTS 10,924,171 B2 2/2021 Chen et al.
2019/0053287 A1 2/2019 Lin et al.
(Continued)

FOREIGN PATENT DOCUMENTS

KR 10-2018-0018436 A 2/2018
WO 15-077619 A2 5/2015
(Continued)

OTHER PUBLICATIONS

Indian Office Action dated Sep. 29, 2022, issued in Indian Application No. 202141011652.
(Continued)

*Primary Examiner* — Erika A Washington
(74) *Attorney, Agent, or Firm* — Jefferson IP Law, LLP

(57) ABSTRACT

A multi Transmission Reception Point (TRP) system is provided. The system includes a User Equipment (UE), a core network, a plurality of cells, and a Transmission Reception Point (TRP) controller (TRP-C). The core network is defined by a Centralized or Cloud Radio Access Network (C-RAN). The plurality of cells where each of which is connected to the UE. Each cell includes at least one TRP of a number of TRPs. The TRP-C is connected to the core network, or cloud network or virtual network and to at least one TRP of the number of TRPs in each cell of the plurality of cell. The TRP-C is configured to determine the number of TRPs required for each cell of the plurality of cells to serve the UE.

20 Claims, 13 Drawing Sheets

(51) Int. Cl.
  *H04B 7/155* (2006.01)
  *H04W 48/16* (2009.01)
  *H04W 48/20* (2009.01)
  *H04W 56/00* (2009.01)
  *H04W 76/15* (2018.01)

(52) U.S. Cl.
  CPC ......... *H04W 48/20* (2013.01); *H04W 56/001* (2013.01); *H04W 76/15* (2018.02)

(56) References Cited

U.S. PATENT DOCUMENTS

| | | | |
|---|---|---|---|
| 2019/0223088 A1* | 7/2019 | Pateromichelakis | H04W 24/02 |
| 2019/0246321 A1 | 8/2019 | Li et al. | |
| 2019/0364579 A1 | 11/2019 | Zhang et al. | |
| 2019/0379506 A1 | 12/2019 | Cheng | |
| 2020/0007282 A1 | 1/2020 | Yoon et al. | |
| 2020/0204311 A1 | 6/2020 | Yoon et al. | |
| 2020/0351055 A1 | 11/2020 | Manolakos et al. | |
| 2021/0006944 A1* | 1/2021 | Raghothaman | H04L 69/22 |
| 2021/0250786 A1* | 8/2021 | Luo | H04B 7/024 |
| 2021/0288696 A1 | 9/2021 | Jung et al. | |
| 2021/0329699 A1* | 10/2021 | Zhou | H04W 76/10 |

FOREIGN PATENT DOCUMENTS

| | | |
|---|---|---|
| WO | 2020/141484 A1 | 7/2020 |
| WO | 2021/001130 A1 | 1/2021 |
| WO | 2021-044190 A1 | 3/2021 |

OTHER PUBLICATIONS

European Search Report dated Feb. 8, 2024; European Appln. No. 22771785.7-1215 / 4201156 PCT/KR2022003751.

International Search Report and written opinion dated Jun. 22, 2022, issued in International Application No. PCT/KR2022/003751.

* cited by examiner

MULTI TRANSMISSION RECEPTION POINT (TRP) SYSTEM AND METHOD THEREOF

CROSS-REFERENCE TO RELATED APPLICATION(S)

This application is a continuation application, claiming priority under § 365(c), of an International application No. PCT/KR2022/003751, filed on Mar. 17, 2022, which is based on and claims the benefit of an Indian provisional patent application number 202141011652, filed on Mar. 18, 2021, in the Indian Patent Office, and of an Indian Complete patent application number 202141011652 filed on Feb. 7, 2022, in the Indian Patent Office, the disclosure of each of which is incorporated by reference herein in its entirety.

FIELD OF INVENTION

The disclosure relates to wireless communication systems. More particularly, the disclosure relates to a Multi Transmission Reception Point (TRP) per system and TRP cell topology.

BACKGROUND

Several wireless technologies have been developed to meet requirements of growing number of broadband subscribers and to provide more and better services. A second generation wireless communication system has been developed to provide voice services while ensuring mobility of users. A third generation wireless communication system supports both voice services and data services. A fourth generation wireless communication system has been developed to provide high-speed data services. However, currently, the fourth generation wireless communication system suffers from lack of resources to meet the growing demand for high speed data services. So, a fifth generation wireless communication system is being developed to meet the growing demand for high speed data services, support ultra-reliability and low latency services.

The fifth generation wireless communication system has been implemented not only in lower frequency bands but also in higher frequency (mm Wave) bands, for example 10 GHz to 100 GHz bands, so as to accomplish higher data rates. In addition, the fifth generation wireless communication system is expected to address different use cases having quite different requirements in terms of data rate, latency, reliability, mobility and the like. However, a User Equipment (UE) demands design of an air-interface of the fifth generation wireless communication system would be flexible enough to serve the UEs having different capabilities depending on the UE's processing requirement of a fifth generation wireless signal. For example, consider use cases of the fifth generation wireless communication system, the fifth generation wireless communication system is expected to address issues related to enhanced Mobile Broadband (eMBB), massive Machine Type Communication (m-MTC), ultra-reliable low latency communication (URLL) etc. The eMBB requirement data in Giga bites (Gbps), high data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, and low mobility address. The ultra reliable low latency communications (URLLC) requirements like very low latency, very high reliability and variable mobility so on and so forth address the market segment representing the Industrial automation application, vehicle-to-vehicle or vehicle-to-infrastructure communication foreseen as one of the enablers for autonomous cars.

For the next generation of wireless communication systems such as sixth generation (6G), beyond fifth generation (5G) various technologies have been under consideration like Visible Light communication (VLC), Terahertz band (THz) Frequencies from 100 GHz to 3 THz, Infrared wave and Ultra violet wave and the like. Among all the technologies the THz band is envisioned as a potential candidate for a diverse range of services which exist within a nano, micro as well as macro scales. The various features of THz band that the THz band provides Tbps data rates, reliable transmission and minimal latency.

Frequencies from 100 GHz to 3 THz are promising bands for the next generation of wireless communication systems because of the wide range of unused and unexplored spectrum. The ultra-high data rates facilitated by mmWave and THz wireless local area and cellular networks will enable super-fast download speeds for in communication devices, autonomous vehicles, robotic controls, the high-definition holographic gaming, entertainment, video conferencing, and high-speed wireless data distribution in data centers. In addition to the extremely high data rates, there are promising applications for future mmWave and THz systems that are likely to evolve in 6G networks, and future generation networks.

As per the literature available for THz band communication system, Terahertz band have specific characteristics like high path loss which includes the spreading as well as absorption loss. The terahertz band can be absorbed by raindrops, ice and grass and any medium containing water molecule. The link is more sensitive than mmWave system so the THz is more fragile. There are high chances that THz link can be lost easily in such a sensitive system. Noise is the important characteristic of THz band which can impact the interference model and signal to interference & noise ratio (SINR) in THz band. Due to the small wavelength at THz frequencies been in the order of hundreds of micrometers, THz waves scatter from almost any object in real scenario, both indoor and outdoor. This can cause scattering and reflection. Due to characteristics of THz band, there is need to have highly directional antenna which can generate very narrow beams in case of THz band.

The transmission and/or reception in a THz band system are based on narrow beams, which suppress the interference from neighboring base stations and extend the range of a THz link. However due to high path loss, heavy shadowing and rain attenuation, reliable transmission at higher frequencies is one of the key issues that need to be overcome in order to make the THz band wave systems a practical reality.

Cellular wireless networks are based on cellular topologies. An area is divided into cells where each cell is served by one base station or access point (AP) or TRP. Each user is served by one or more AP by the TRP depending upon the technology. There are many limitations of cellular system like users who are at a center of a cell can achieve desired data rates but users at the cell edge have inter-cell interference and handover issues which limit the cell-edge performance. The cell can cover a limited number of user terminals, hence limited capacity. Issue of Load Balancing in Cell Networks as some APs will be overloaded and others relatively idle. The UE will be connected to single cell, so any obstacle in signal path can impact the signal power. In mmWave bands and high frequencies, which can lead to loss of signal and data. Billions of UEs need high throughput, cellular based system cannot provide to everyone as users at cell edge will have interference from neighboring cells, hence impact the throughput.

Cellular network and the UE may not be able to handle the 6G requirements due to above mentioned limitation. The cell size may further be reduced in 6G due to usage of the THz frequency. When the cell size is reduced to tens of meters in 5G cellular networks, quickly moving from one terminal or other terminal leads to frequent handovers in 5G cellular networks and additional latency is inevitable for wireless communications. The frequent handovers, usually degrades the user experience as it can cause interruption in ongoing data services The THz system can easily be impacted due to human or environment obstacle, so more communication paths are needed. There is need to move from Fixed Topology to Dynamic Topology which can break the conventional cellular system and the UE design.

There is a need to design a new system and a UE which can work without boundaries of existing cells to tackle above mentioned issues.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, an aspect of the disclosure is to provide a Multi Transmission Reception Point (TRP) system. The TRP system includes a TRP controller (TRP-C). The TRP-C is connected to a core network, or a cloud network, or a virtual network with cells. The cells are composed of multiple TRPs. The TRP-C is configured to determine a number of TRPs required for each cell to serve a User Equipment (UE) in a 6G network and future generation networks.

Another aspect of the disclosure is to provide a cell topology. The cell topology defines a way in which each cell including the multi TRPs are connected inside the core network to serve the UE in the 6G network and the future generation networks.

Another aspect of the disclosure is to perform procedures such as a handover procedure, a measurement procedure, a cell reselection procedure, and decoding of data at the core network using multi TRP per cell based on a cell information associated with the cell topology.

Additional aspects will be set forth in part in the description which follows and, in part, will be apparent from the description, or may be learned by practice of the presented embodiments.

SUMMARY

In accordance with an aspect of the disclosure, a multi TRP system is provided. The system includes a UE, a core network, a plurality of cells, and a TRP-C. The core network is defined by a Centralized or Cloud Radio Access Network (C-RAN). The plurality of cells where each of which is connected to the UE. Each cell includes a TRP of a number of TRPs. The TRP-C is connected to the core network or a cloud network or a virtual network and a TRP of the number of TRPs in each cell of the plurality of cell. The TRP-C is configured to determine the number of TRPs required for each cell of the plurality of cells to serve the UE.

In an embodiment, the TRP-C is configured to form a cell topology for each cell of the form the plurality of cells based on the determined number of TRPs for each cell. A cell information associated with the cell topology is transmitted to the UE during an initial cell selection procedure in a Radio Resource Control (RRC) message. The cell information includes one of a common cell identifier for all TRPs available in each of the cell without TRP identifier for each of the TRPs in each of the cell, and a common cell identifier for all TRPs available in each of the cell with separate TRP identifier for each of the TRPs in each of the cell, and a separate TRP identifier for each of the TRPs in each of the cell without a common cell identifier for all TRPs available in each of the cell.

In an embodiment, the UE is configured to receive the cell information associated with the cell topology from the TRP-C and perform at least one of a handover procedure, a beam management, formation of clusters or identifying the TRPs to serve users, addition and deletion of the TRPs in a cluster based on the cell information associated with the cell topology.

In an embodiment, the cell reselection procedure based on the cell information receives a Primary Synchronization Signal (PSS) or a Secondary Synchronization Signal (SSS) from the TRP-C and then the cell reselection procedure decodes the PSS or the SSS based on the received cell information associated with the cell topology. When the received cell information indicates one of a common cell identifier for all TRPs available in each of the cell with separate TRP identifier for each of the TRPs in each of the cell by decoding ternary synchronization signal (TSS), and a separate TRP identifier for each of the TRPs in each of the cell without a common cell identifier for all TRPs available in each of the cell. The cell reselection procedure further decodes the TSS of a TRP identifier associated with the TRP identifier and the common cell identifier and performs a cell selection based on the obtained TRP identifier and the obtained common cell identifier.

In an embodiment, the TRP controller is configured to form specific beam using the at least one TRP of the number of TRP in each of the cell, and transmit to the UE one of a Channel State Information (CSI) configuration of the specific beam formed by each of the at least one TRP to enable the UE to measure and report the specific beams, a unique sequence signature for each of the specific beam formed by each of the at least one TRP to enable the UE to measure and report the specific beams, and a unique beam identifier (ID) associated with each of the specific beam formed by each of the at least one TRP to enable the UE to measure and report the specific beams.

In an embodiment, wherein the UE is configured to receive from the TRP controller one of the CSI configuration of the specific beam formed by each of the at least one TRP, the unique sequence signature for each of the specific beam formed by each of the at least one TRP, and the unique beam ID associated with each of the specific beam formed by each of the at least one TRP and measure and report the specific beam formed by each of the at least one TRP based on one of the CSI configuration of the specific beam formed by each of the at least one TRP, the unique sequence signature for each of the specific beam formed by each of the at least one TRP, and the unique beam ID associated with each of the specific beam formed by each of the at least one TRP.

In accordance with another aspect of the disclosure, a method for implementing a multi TRP system using a TRP-C is provided. The method includes connecting, by the TRP-C, a plurality of cells to a User Equipment (UE). Each cell includes a TRP of a number of TRP. The method further includes connecting, by the TRP-C, the UE to a core network and to the TRP of a number of TRPs in each cell of the plurality of cells. The TRP-C is configured to determine the number of TRPs required for each cell of the plurality of cells to serve the UE.

In accordance with another aspect of the disclosure, a TRP-C entity in a TRP system, the TRP-C entity comprising: a transceiver; and a processor coupled with the transceiver and configured to: connect a plurality of cells to a User Equipment (UE); and determine a number of TRPs for each cell of the plurality of cells to serve the UE, wherein the TRP-C entity is connected to a core network, the core network being defined by a centralized or cloud radio access network (C-RAN).

In accordance with another aspect of the disclosure, method of transmission reception point (TRP) controller (TRP-C) entity in a multi TRP system, the method comprising: connecting a plurality of cells to a User Equipment (UE); and determining a number of TRPs for each cell of the plurality of cells to serve the UE, wherein the TRP-C entity is connected to a core network, the core network being defined by a centralized or cloud radio access network (C-RAN).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the thereof, and the embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION OF INVENTION

Figure 1:
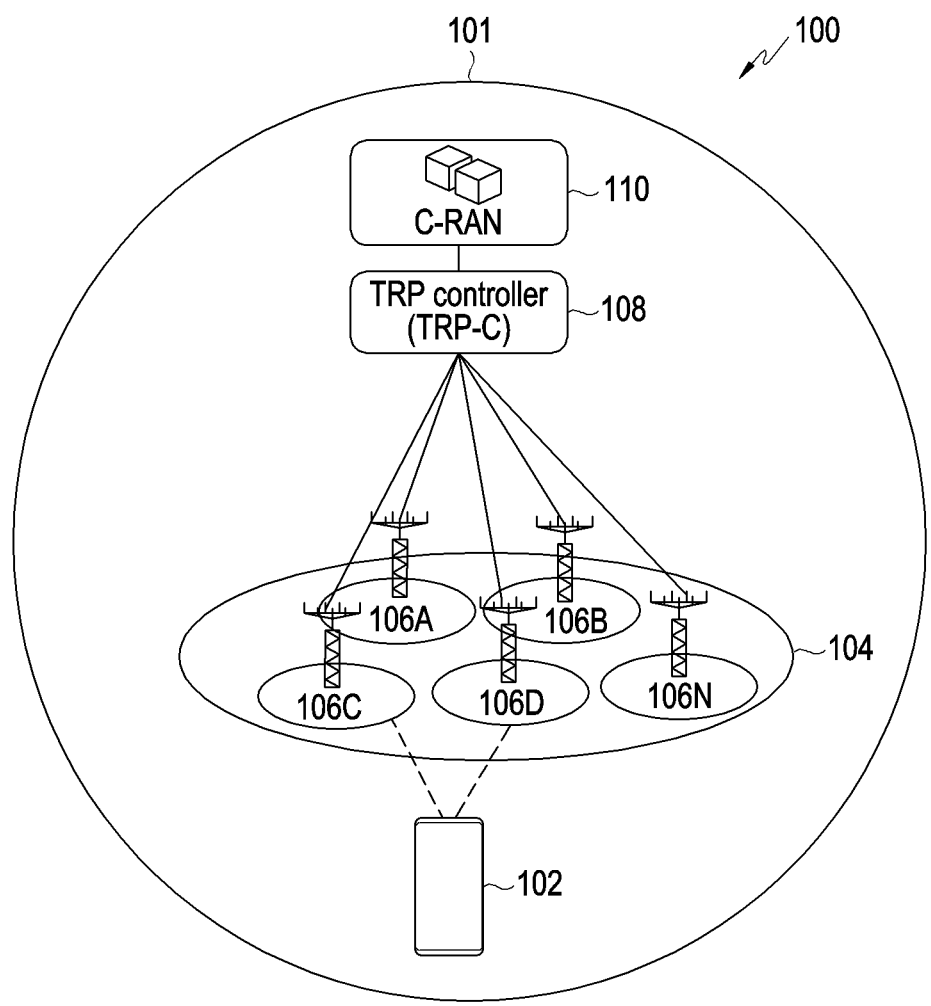
FIG. 1 illustrates a multi Transmission Reception Point (TRP) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

As mentioned, there remains a need for a multi TRP system. The embodiments herein achieve this by providing a TRP-C for connecting to at least one of core network, or a cloud network, or a virtual network and to a TRP of a number of TRPs in each cell of the plurality of cells. Referring now to the drawings, and more particularly to FIGS. 1, 2A, 2B, 3A, 3B, 4A, 4B, 5 to 7, 8A, 8B, 9, 10, and 11, where similar reference characters denote corresponding features consistently throughout the figures, there are shown preferred embodiments.

FIG. 1 illustrates the multi TRP system (100), according to an embodiment of the disclosure.

Referring to FIG. 1, the TRP system (100) includes a UE (102), a core network (101) or a cloud network, or a virtual network, a plurality of cells, and a TRP-C (108). The core network (101) is defined by a C-RAN (110). The plurality of cells where each of the cell is connected to the UE (102). Each cell (104) includes a TRP (106A) of a number of TRPs. The TRP-C (108) is connected to at least one of the core network (101), or the cloud network, or the virtual network and to the TRP (106A) of the number of TRPs in each cell (104) of the plurality of cell. The TRP-C (108) is configured to determine the number of TRPs required for each cell (104) of the plurality of cells to serve the UE (102).

The TRP-C (108) is configured to form a cell topology for each cell (104) of the form the plurality of cells based on the determined number of TRPs for each cell (104). The TRP-C (108) is further configured to transmit a cell information associated with the cell topology to the UE (102) during an initial cell selection procedure in a Radio Resource Control (RRC) message. The cell information includes one of a common cell identifier for all TRPs available in each of the cell (104) without TRP identifier for each of the TRPs in each of the cell (104), a common cell identifier for all TRPs available in each of the cell with separate TRP identifier for each of the TRPs in each of the cell, or a separate TRP identifier for each of the TRPs in each of the cell without a common cell identifier for all TRPs available in each of the cell. The common cell identifier includes one of a THz Cell identifier includes multiple TRPs, a common C-RAN identifier, a central unit (CU) identifier, and a distributed unit (DU) identifier. The C-RAN identifier, the CU identifier and the DU identifier is decoded during cell selection by the UE (102).

The TRP-C (108) is further configured to form specific beam using the TRP (106A) of the number of TRP in each of the cell. The TRP-C (108) is further configured to transmit to the UE (102) one of: a Channel State Information (CSI) configuration of the specific beam formed by each of the TRP (106A) to enable the UE (102) to measure and report the specific beams, a unique sequence signature for each of the specific beam formed by each of the TRP (106A) to enable the UE (102) to measure and report the specific beams, and a unique beam ID associated with each of the specific beam formed by each of the TRP (106A) to enable the UE (102) to measure and report the specific beams.

The UE (102) is configured to receive the cell information associated with the cell topology from the TRP-C (108). The UE (102) is further configured to perform a handover procedure, a beam management, formation of clusters or identifying the TRPs to serve users, addition and deletion of the TRPs in a cluster based on the cell information associated with the cell topology.

The UE (102) is configured to receive from the TRP-C (108) one of the CSI configuration of the specific beam formed by each of the TRP (106A), the unique sequence signature for each of the specific beam formed by each of the TRP (106A), and the unique beam ID associated with each of the specific beam formed by each of the TRP (106A). The UE (102) is further configured to measure and report the specific beam formed by each of the TRP (106A) based on one of the CSI configuration of the specific beam formed by each of the TRP (106A), the unique sequence signature for each of the specific beam formed by each of the TRP (106A), and the unique beam ID associated with each of the specific beam formed by each of the TRP (106A).

Each said TRP (106A-106N) is composed of one or more antennas enabling multiple beams to be formed for serving the UE (102). The TRP-C (108) is configured to cluster the number of TRPs within the cell into one of a serving cluster and a secondary cluster. The serving cluster includes a TRP which is currently serving the UE (102). The secondary cluster includes a TRP in a vicinity of the UE (102) which is not currently serving the UE (102). The TRP-C (108) is further configured to configure the TRP (106A) within the cell (104) into one of a dynamic TRP set and a fixed TRP set. The dynamic TRP set is configured based on one of a channel quality associated with the UE (102), an uplink sounding reference signal, a channel state information of the UE (102), a location of the UE (102), and a position of the UE (102). The TRP-C (108) is further configured to perform addition or deletion of nodes in the core network (101), and switch between master nodes is based on at least one of UE vicinity to the nodes, a measurement report from the UE (102), a poor connection with an existing nodes, availability of Radio Frequency (RF) chains, to boost data rates or to meet quality of service (QoS) requirements of network coverage. The nodes and the master nodes provide connection between the UEs and the next generation of the wireless communication networks.

Figure 2A:
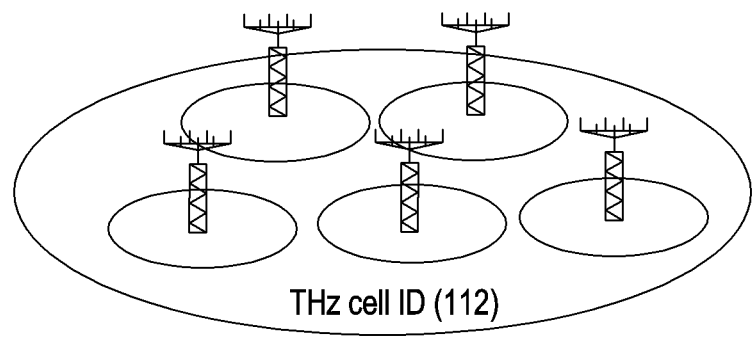
FIG. 2A illustrates a network topology for multi TRP per cell having common THz Cell ID and with no TRP identifier of proposed method, according to an embodiment of the disclosure.

FIG. 2A illustrates a network topology for multi TRP per cell having common THz Cell ID and with no TRP identifier of proposed method, according to an embodiment of the disclosure.

Referring to FIG. 2A consider a conventional scenario, the proposed method is having multiple TRPs which will be covered under one common THz cell ID. The region will be defined by C-RAN or Central Unit (CU) or core NW or Distributed unit (DU) or any other possible NW entity. Range of THz Cell ID depends upon network topology or services or network architecture. The network will only report this THz cell ID to the UE, the UE does not aware that which TRP is serving it. There can be other identifiers also for this particular region which could be based on NW decision say it could be C-RAN ID or CU ID or DU ID. The TRPs under one C-RAN can be of same or different frequency.

Consider a conventional scenario, the UE (102) will power on and search for cell/TRP as per existing process. All TRPs can transmit the same PSS/SSS signals which will be decode same Cell ID or THz cell ID or C-RAN ID or any other ID as mentioned above. UE cannot differentiate between different TRPs but core network (101) can internally differentiate among the different TRPs and can make out UE is camped on which specific TRP. System information of these TRPs can be same or different depending upon the network architecture and design e.g., Neighbor frequency list or cell list or resources could be different.

Each TRP will consist of one or multiple beams. These beams ID can be same or different for different TRPs. Different TRPs can have same set of beams which can cause ping pong issues among multiple TRPs. As UE (102) does not know about TRPs it can end up in measuring the nearby beams belong to different TRPs and send the report for the same. For the UE if it ends up in detecting the same set of beams from different TRPs, it may overwrite the report and may send the incorrect information to network. Also, when UE (102) send the beam measurement report, network may not be aware about the report belongs to which specific TRP as beams may also be same. Network can provide configuration for CSI and slots to measure and report CSI for specific beams to the UE so that UE can only measure specific beams. Another possible method is network can assign different sequence signature for multiple beams and accordingly UE can measure and report the beams. Another possible way is to have beam ID or sub ID i.e., each TRP can have unique beam ID within a region or each beam have sub ID within each TRP. The unique combination of TRP and beams will differentiate multiple beams across the region.

A Network may allocate the common UE identifier to the UE (102) which it can use to decode the data. The network may allocate the cell specific or TRP specific identifier to the UE (102) which it can use to decode the data. Multiple TRPs can be associated with same frequency or different frequency. UE (102) can receive data from single TRP or multiple TRP which can depend on various factors like UE capability where it can indicate the network that whether it can support multiple RF or not or it can be also be based on data rate requirement, current channel condition etc. network can configure the measurements for multiple TRPs and based on measurement report can decide which TRP can serve the UE (102). Another way is UE (102) will report its location or Uplink Tracking signal, based on that network will decide the TRPs. The network determines the UE (102) location (e.g., latitude and longitude) by processing the measurements reported by the UE (102).

Figure 2B:
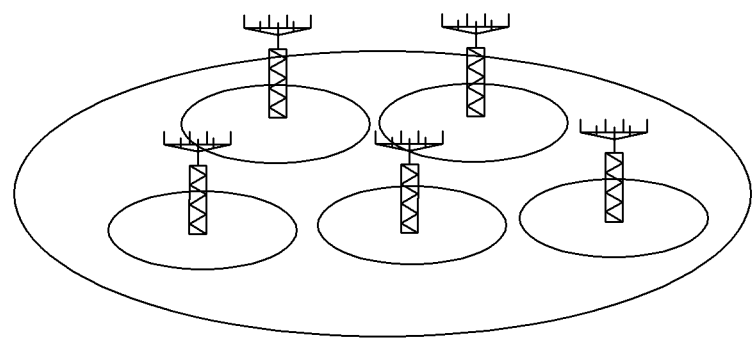
FIG. 2B illustrates a network topology for multi TRP per cell having No Cell ID and with no TRP identifier of proposed method, according to an embodiment of the disclosure.

FIG. 2B illustrates a network topology for multi TRP per cell having No Cell ID and with no TRP identifier of proposed method, according to an embodiment of the disclosure.

Referring to FIG. 2B, consider a conventional scenario, the multiple TRPs will cover under one common area or region. The region will be defined by C-RAN or Central Unit (CU) or core network or Distributed unit (DU) or any other possible NW entity. Range of this area depends upon network topology or services or network architecture. The network will only report C-RAN ID or CU ID or DU ID to the UE, the UE does not aware that which TRP is serving it. The TRPs under one C-RAN can be of same or different frequency.

Consider a conventional scenario, the UE (102) will power on and search for cell/TRP as per existing process. All TRPs can transmit the same PSS/SSS signals which will be decode same identifier which can be based on C-RAN ID or CU ID or DU ID or any other ID as mentioned above. UE cannot differentiate between different TRPs but network can internally differentiate among the different TRPs and can make out UE is camped on which specific TRP. System information of these TRPs can be same or different depending upon the network architecture and design e.g., Neighbor frequency list or cell list or resources could be different.

Figure 3A:
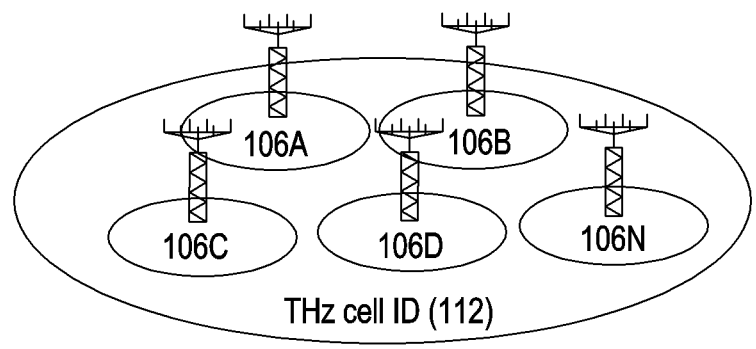
FIG. 3A illustrates a network topology for multi TRP per cell having common tera hertz (THz) cell ID for each TRP of proposed method, according to an embodiment of the disclosure.

FIG. 3A illustrates a network topology for multi TRP per cell having common Cell ID for multiple TRP with unique identifier for each TRP of proposed method, according to an embodiment of the disclosure.

Referring to FIG. 3A, for example, consider a conventional scenario, where the TRP system (100) is having multiple TRPs which will be covered under one common THz cell ID (112). A covered region is defined by the C-RAN (110) or Central Unit (CU) or core network (101) or Distributed unit (DU) or any other possible network entity. A range of the THz cell ID (112) depends upon a network topology or services or a network architecture. The core network (101) will only report the THz cell ID (112) to the UE (102), the UE (102) is not aware that which TRP is serving it. There can be other identifiers also for the TRP or a particular region which could be based on the network decision, may include C-RAN ID or CU ID or DU ID. The TRPs (106A-106N) under the C-RAN (110) can be of same or different frequency.

The TRP system (100) includes the UE (102), which will power on and search for cell (104) or the TRP (106A). All the TRPs (106A-106N) can transmit a same Primary Synchronization Signal (PSS) or a Secondary Synchronization Signal (SSS) which will decode same Cell ID or THz cell ID (112) or C-RAN ID or any other ID as mentioned above. The UE (102) cannot differentiate between different TRPs (106A-106N) but the core network (101) can internally differentiate among the different TRPs (106A-106N) and can make out where the UE (102) is camped on and on which specific TRP (106A). A system information of the TRPs (106A-106N) can be same or different depending upon the core network (101) architecture and design for example neighbor frequency list or cell list or resources could be different.

Each TRP will consist of one or multiple beams. The multiple beams include a beam ID. The beam ID can be same or different for different TRPs. Different TRPs can have same set of beams which can cause ping pong issues among multiple TRPs (106A-106N). As the UE does not know about the TRPs it can end up in measuring the nearby beams belong to different TRPs and send a report for the same. For the UE (102) if it ends up in detecting the same set of beams from different TRPs, it may overwrite the report and may send the incorrect information to the core network (101). Also, when the UE (102) send the beam measurement report, the core network (101) may not be aware about the report belongs to which specific TRP (106A) as beams may also be same. There is need to define method to through which network can understand the beam which is reported by UE (102) belongs to which TRP. The core network (101) can provide configuration for CSI and slots to measure and report CSI for specific beams to the UE (102) so that UE (102) can only measure specific beams. Another possible method is network can assign different sequence signature for multiple beams and accordingly UE (102) can measure and report the beams. Another possible way is to have beam ID or sub ID for each TRP can have unique beam ID within a region or each beam have sub ID within each TRP. The unique combination of TRP (106A-106N) and beams will differentiate multiple beams across the region.

The core network (101) may allocate the common UE identifier to the UE (102) which it can use to decode the data. The core network (101) may allocate the Cell specific or TRP specific identifier to the UE (102) which it can use to decode the data. The multiple TRPs (106A-106N) can be associated with same frequency or different frequency. The UE (102) can receive data from single TRP (106A) or multiple TRP (106A-106N) which can depend on various factors like UE capability where it can indicate the network that whether it can support multiple Radio Frequency (RF) or not or it can be also be based on data rate requirement, current channel condition etc. network can configure the measurements for multiple TRPs (106A-106N) and based on measurement report can decide which TRP can serve the UE (102). Another way is UE (102) will report its location or Uplink Tracking signal, based on that network will decide the TRPs (106A-106N). The core network (101) determines the UE (102) location (For example, latitude and longitude) by processing the measurements reported by the UE (102).

Figure 3B:
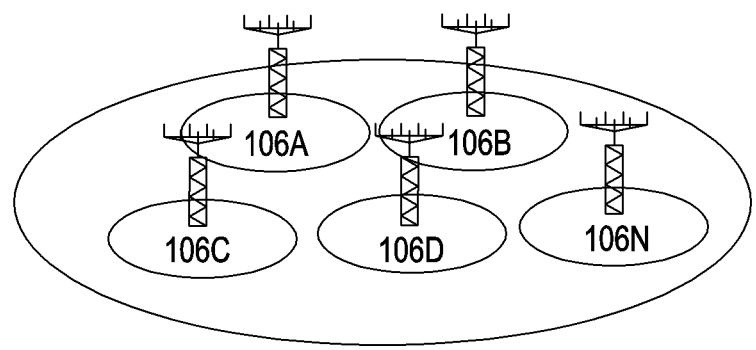
FIG. 3B illustrates a network topology for multi TRP per cell having common area for multiple TRP with unique identifier for each TRP, according to an embodiment of the disclosure.

FIG. 3B illustrates a network topology for multi TRP per cell having common area for multiple TRP with unique identifier for each TRP, according to an embodiment of the disclosure.

Referring to FIG. 3B, for example, consider a conventional scenario, the multi TRP system (100) having multiple TRPs (106A-106N) which will be covered under one common area or region. The region will be defined by C-RAN (110) or central unit (CU) or the core network (101) or distributed unit (DU) or any other possible network entity. Range of the area depends upon network topology or services or network architecture. The core network (101) will only report C-RAN ID or CU ID or DU ID to the UE (102), the UE (102) is not aware that which TRP is serving it. The TRPs (106A-106N) under one C-RAN (110) can be of same or different frequency.

Consider a conventional scenario, the multi TRP system (100) provides the UE (102), which will power on and search for cell or TRP as per existing process. All TRPs (106A-106N) can transmit the same PSS or SSS signals which will be decode same identifier which can be based on C-RAN ID or CU ID or DU ID or any other ID as mentioned above. The UE (102) cannot differentiate between different TRPs but network can internally differentiate among the different TRPs and can make out UE (102) is camped on which specific TRP. The system information of the TRPs can be same or different depending upon the network architecture and design e.g., Neighbor frequency list or cell list or resources could be different.

The core network topology for multi TRP per cell having common Cell ID for multiple TRPs (106A-106N) with unique identifier for each TRP includes providing by the multi TRP system (100), the multiple TRPs (106A-106N) which will be covered under one common THz cell ID or any other cell ID or C-RAN ID which belong to 5G or any other wireless system. Each TRP will have unique TRP ID. The region or area for Cell ID defined by the C-RAN (110) or Central Unit (CU) or the core network (101) or Distributed unit (DU) or any other possible network entity. Range of THz Cell ID depends upon network topology, services, or network architecture. Network will report THz cell ID as well as TRP ID to the UE (102) or alternatively it can only report the TRP ID to the UE (102). Here Cell or area or region can have multiple TRPs.

Consider a conventional scenario, the multi TRP system (100) provides the UE (102), which will power on and search for cell or TRP as per existing process. All TRPs can transmit the same PSS or SSS signals which will decode same Cell ID or THz cell ID or any other ID as mentioned above. The UE (102) may only be able to decode signals and may not be aware of any cell ID. Once the UE (102) decode the PSS or SSS it can further decode TSS (Ternary synchronization signal) or any other signal to decode the TRP ID. The TSS can be part of SSB block or it can be decoded at different slots which will give UE (102) unique TRP ID. At the end of cell selection procedure, the UE (102) will be well aware about the TRP ID and may be about cell ID too. The system information of the TRPs (106A-106N) can be same or different depending upon the network architecture and design e.g., Neighbor frequency list or cell list or resources could be different.

Another alternative is all TRPs (106A-106N) can transmit the different PSS or SSS signals, which will decode same Cell ID or THz cell ID, or any other ID as mentioned above. The UE (102) may only be able to decode signals and may not be aware of any cell ID. Based on PSS or SSS UE may be able to decode the TRP ID itself and network may inform the cell ID associated with the TRP in any layer 2 or layer 1 or layer 3 message. Alternatively, once the UE (102) decode the PSS or SSS, the UE (102) can further decode TSS (Ternary synchronization signal) or any other signal to decode the TRP ID. The TSS can be part of SSB block or it can be decoded at different slots which will give UE unique TRP ID. The different PSS or SSS signal can also provide the different TRP ID. Network can configure common cell ID or any other network identifier through RRC message.

The UE (102) decodes PSS or SSS or TSS and gets THz cell or TRP-ID (202). In a case, beam 1 to K for each TRP be mapped to SSB indices 1 to K. The UE (102) decoded its SSB index. It is noteworthy that each beam is now uniquely identifiable as TRP-ID+Beam-ID is its "over-all beam id". Each beam within the area or region is therefore, uniquely identifiable.

Each of the TRPs transmits identical PSS or SSS. The UE (102) decodes a common cell-id for each of the beams. Each beam within the region is mapped to a different Demodulation Reference Signal (DM-RS) sequence and is uniquely identifiable by a unique Synchronization Signal Block (SSB) index within the region. The user can be provided a mapping between the SSB indices and TRP-ID's within the region or cell ID region in System Information Block (SIB) post initial access. The UE (102) will use the mapping between SSB index and TRP-ID for Intra cell and inter cell measurement reports.

In an embodiment, the core network topology for multi TRP per cell having separate TRP identifier includes providing by the multi TRP system (100), the multiple TRPs (106A-106N) which will be covered under one common area belonging to 6G or any other wireless system like 5G. Each TRP will have unique TRP ID. The region will be or range for area defined by the C-RAN (110) or Central Unit (CU) or the core network (101) or Distributed unit (DU) or any other possible network entity. Range of area depends upon network topology, services, or network architecture. Network will report network ID, which can be based on C-RAN ID as well as TRP ID to the UE (102), or alternatively it can only report the TRP ID to the UE (102). Here Cell or area or region can have multiple TRPs (106A-106N). It can be similar to cell have multiple beams.

The UE (102), which will power on and search for cell/TRP as per existing process. All TRPs can transmit the different PSS/SSS signals which will decode different TRP ID. It can also decode the TRP ID as mentioned in above methods. The network may provide common identifier to decode the data instead of cell specific RNTI. The identifier will not change when the TRP or area changes. The procedure mentioned in the common THz Cell ID for separate TRP identifier will be applicable for C-RAN ID for separate TRP identifier. All the other above mention methods will be applicable here also.

The third generation partnership project (3GPP) specification TR 38.801 has provided various Functional split options for Radio Access Network (RAN). Each option has various functional split, have centralized, and distributed scheduling based on option type. The methods are applicable for all the possible function split between central and distributed unit based on various options like RRC or PDCP (1A-like split) PDCP or RLC split, intra RLC split, RLC-MAC split, intra MAC split, MAC-PHY split, intra PHY split, PHY-RF split etc. The method explained the multi TRP system (100) by considering option 8 as one of the possible split option for 6G system. Option 8 allows separating the RF and the PHY layer. The split permits centralization of processes at all protocol layer levels, resulting in very tight coordination of the RAN which allows efficient support of functions such as a Coordinated Multipoint (COMP), a multiple in multiple out (MIMO), load balancing, and user-mobility. Various network topologies as mentioned above will be applicable for all possible standalone and Non-Standalone systems.

Figure 4A:
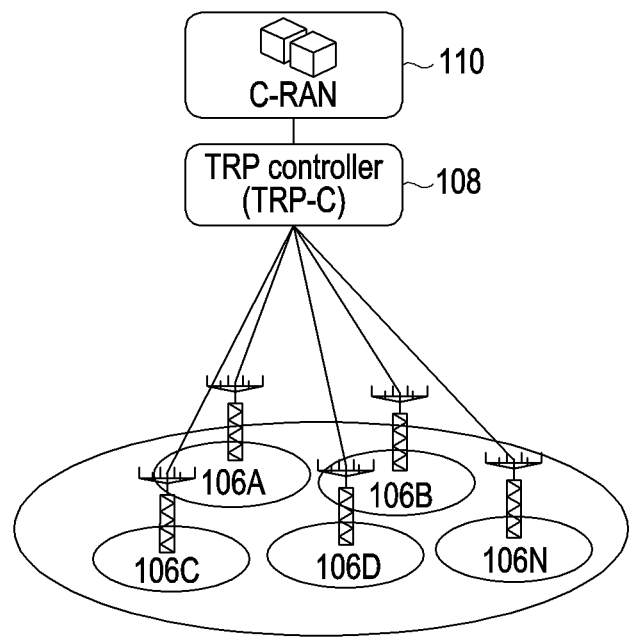
FIGS. 4A, and 4B illustrate a deployment scenario of area or a cell consisting of the Multi TRP of a core network connected to a TRP controller (TRP-C) and a Centralized-Radio Access Network (C-RAN), according to various embodiments of the disclosure.
Figure 4B:
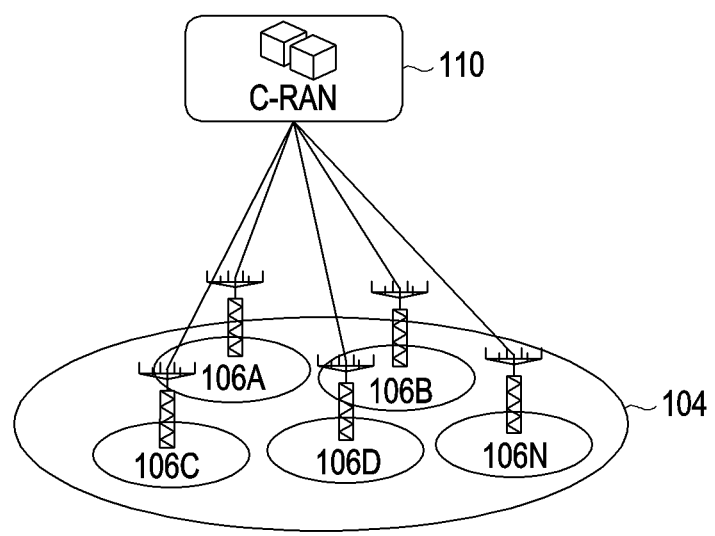

FIGS. 4A, and 4B illustrate a deployment scenario of area or a cell consisting of the Multi TRP (106A-106N) of the core network (101) connected to the TRP-C (108) and the C-RAN (110), according to various embodiments of the disclosure.

Referring to FIG. 4A, the C-RAN (110) can be CU or functionality of CU and DU or new functionality, which can have radio access Network functionality. The C-RAN (110) has defined area or region which can be cell or C-RAN region. A cell or C-RAN (110) is composed of multiple TRPs (106A-106N) on the same or different carrier. A user can be served through single TRP (106A) or multiple TRPs (106A-106N). The TRP-C (108) is new network node which communicates with the multiple TRPs (106A-106N) and C-RAN entity.

The TRP-C (108) is a new entity, which will control the multiple TRPs (106A-106N) within the cell or region defined by the C-RAN (110). TRP-C (108) can be new node at network or it can be part of existing network nodes like CU, DU etc. The THz or high frequency mmW link can be sensitive can easily cause issues like blockage, deafness, Handover and impact the user experience. To have quick recovered between the UE (102) and the core network (101), TRP-C module can play important role as it can decide which TRP (106A) or TRPs (106A-106N) can serve the UEs. The main functionality of TRP-C (108) could be Beam management, switching of master node or decision about master node, Handover intra TRP or and inter TRP, Formation of cluster (list of TRPs who should serve the user) for each UE (102), Addition and deletion of nodes in the cluster and the like.

Referring to FIG. 4B, depicts possible deployment for cell free architecture. In the deployment for cell free architecture, the TRP-C (108) module is part of C-RAN (110) only. The multiple TRPs are directly connected with C-RAN (110) through wired or wireless interface and is being handled by module TRP-C (108) which is part of CU, DU or C-RAN entity. The central unit could act as a mobility anchor and a centralized control node for multiple TRPs.

Figure 5:
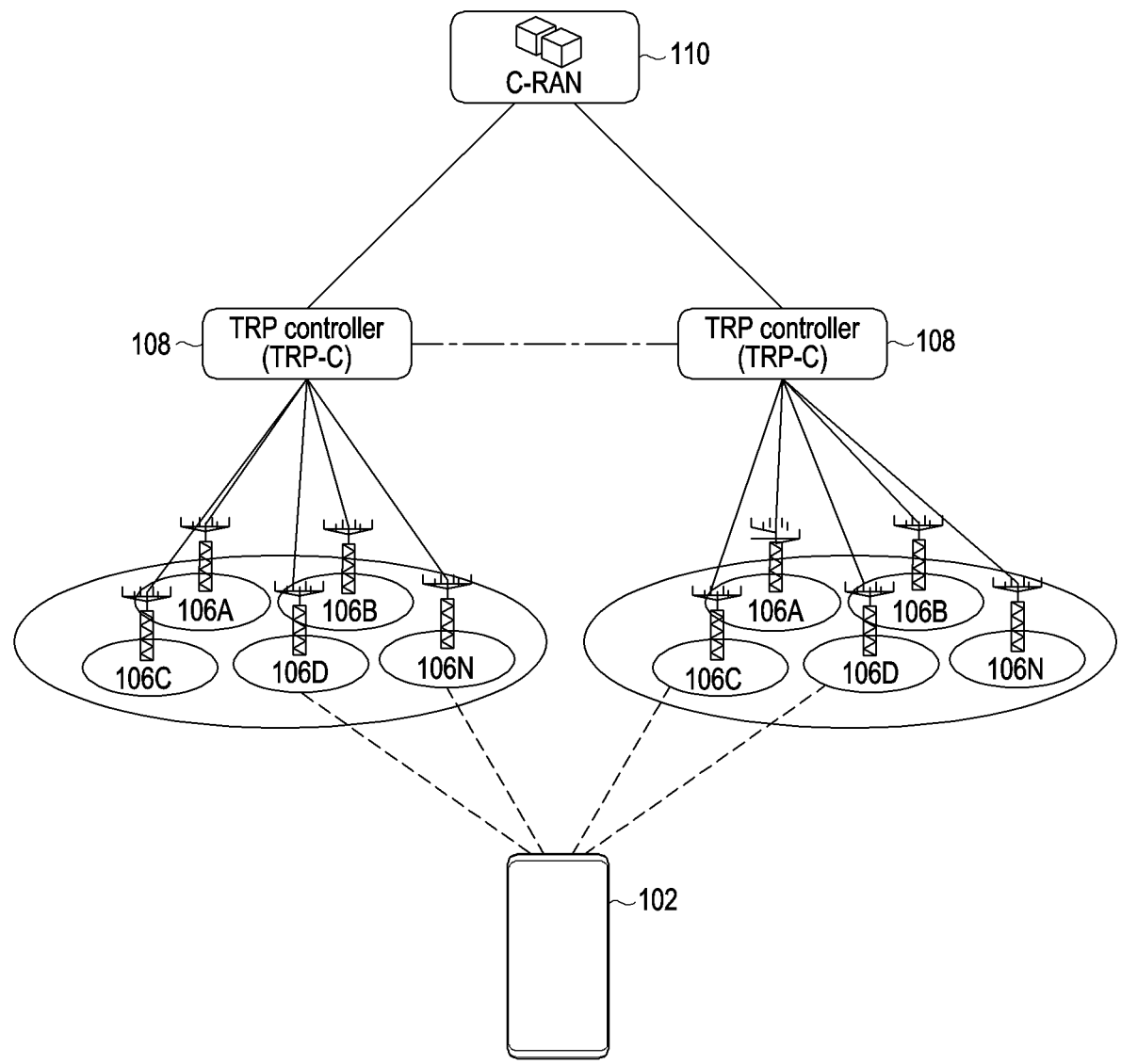
FIG. 5 illustrates a deployment scenario of multiple area or cell consisting of the Multi TRP of the core network connected to the TRP-C and the C-RAN, according to an embodiment of the disclosure.

FIG. 5 illustrates a deployment scenario of multiple area or Cell consist of Multi TRP of a radio network connected to a controller/C-RAN (110) or Control Unit, according to an embodiment of the disclosure.

Referring to FIG. 5, the C-RAN (110) is controlling multiple such cells or areas. Each set of the areas or cells consist of multiple TRPs. A cell is composed of multiple TRPs on the same or different carrier. The TRP-C module controls the multiple TRPs (106A-106N) within cell or area. When user is served through multiple TRPs which belongs to different TRP-C (108) but served by common C-RAN (110), then coordination between two TRP-C are needed. The TRP-C (108) can co-ordinate with each other through Xx interface when it is adding, removing or modifying the TRPs which is serving the UE (102). The central unit could also act as a mobility anchor and a centralized control node for multiple TRPs (106A-106N).

Figure 6:
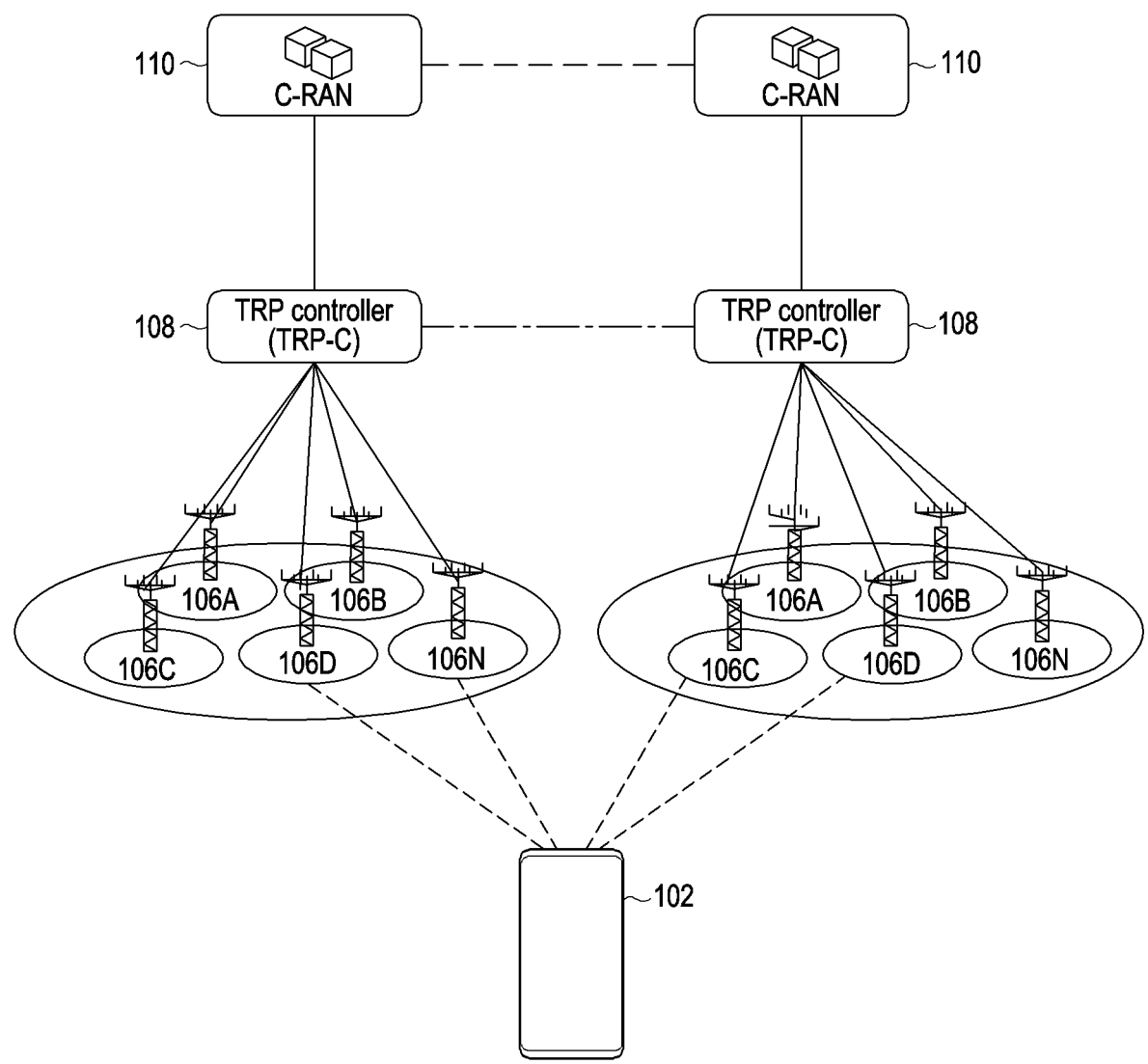
FIG. 6 illustrates a deployment scenario of two or more cell of the core network connected to a multiple interconnected the TRP-C and the C-RAN, according to an embodiment of the disclosure.

FIG. 6 illustrates a deployment scenario of two or more cell of a radio network connected to a multiple interconnected controller or C-RAN (110) or Control Unit, according to an embodiment of the disclosure.

Referring to FIG. 6, the multi TRP system (100) provides a cell-free massive MIMO system with user-centric clustering and multiple interconnected Control unit. The user-centric cluster might include TRPs (106A-106N) belonging to different cell-centric clusters. The presence of multiple CUs, each one managing a cell-centric cluster, allows for reduced deployment complexity. The UE (102) is then served by all cell-centric clusters involved in the user-centric cluster. There is need of tight coordination between multiple controller and multiple C-RAN entity.

Figure 7:
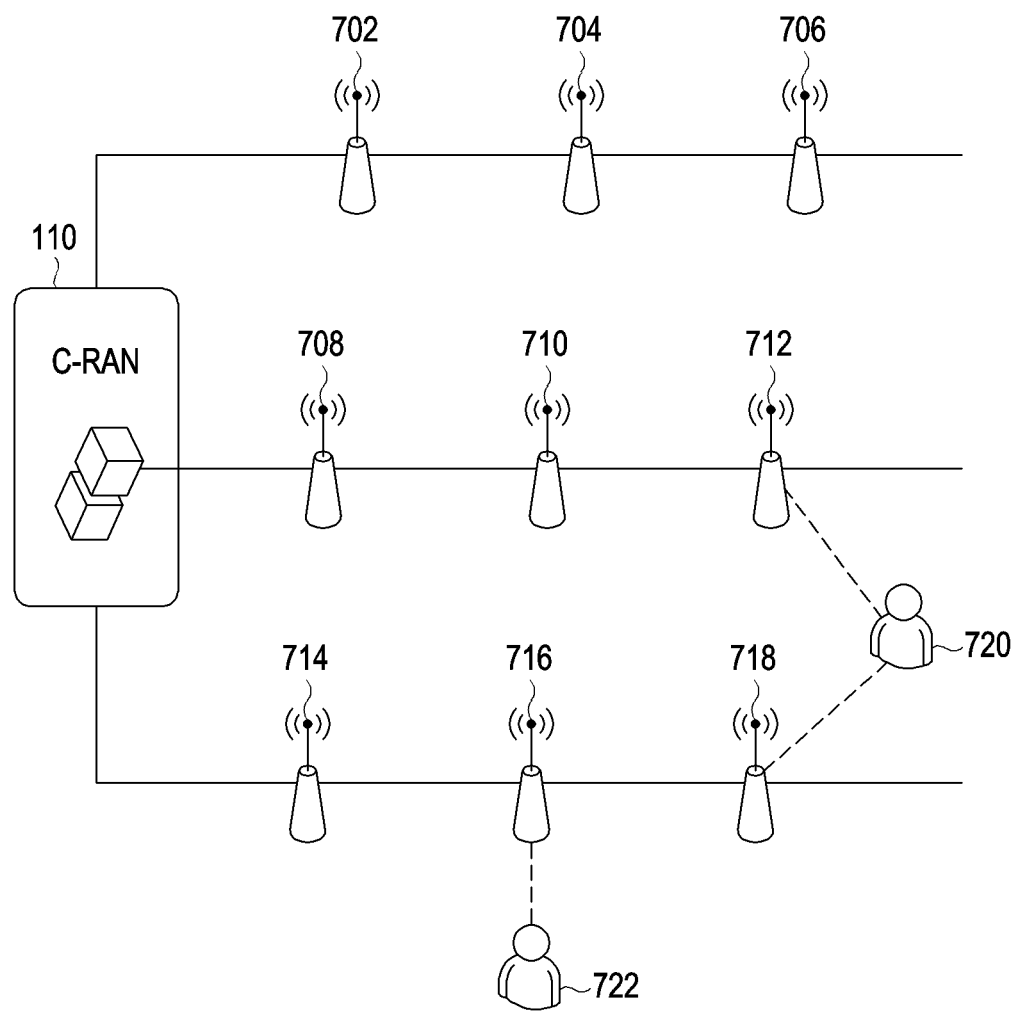
FIG. 7 illustrates a deployment scenario of TRPs that are connected with each other and via front-haul connections to the C-RAN, according to an embodiment of the disclosure.

FIG. 7 illustrates a deployment scenario of TRPs (702-718) connected with each other and via front-haul connections to central units or C-RAN (110), according to an embodiment of the disclosure.

Referring to FIG. 7, the TRPs (702-718) will co-ordinate with each other which are responsible for the coordination. The user (720, 722) can be served with single or multiple TRPs (702-718). All TRPs (702-718) can be connected to TRP-C (108) or C-RAN (110) or connected with each other. Scheduling for all the TRPs (702-718), which TRPs can serve the UE (102) or any decision related to signaling and user plane can be taken by the TRP-C (108) or the C-RAN (110). As the TRPs (702-718) are connected with each other, the UE (102) can pass the data to another TRP if current TRP is not able to serve the UE (102).

Figure 8A:
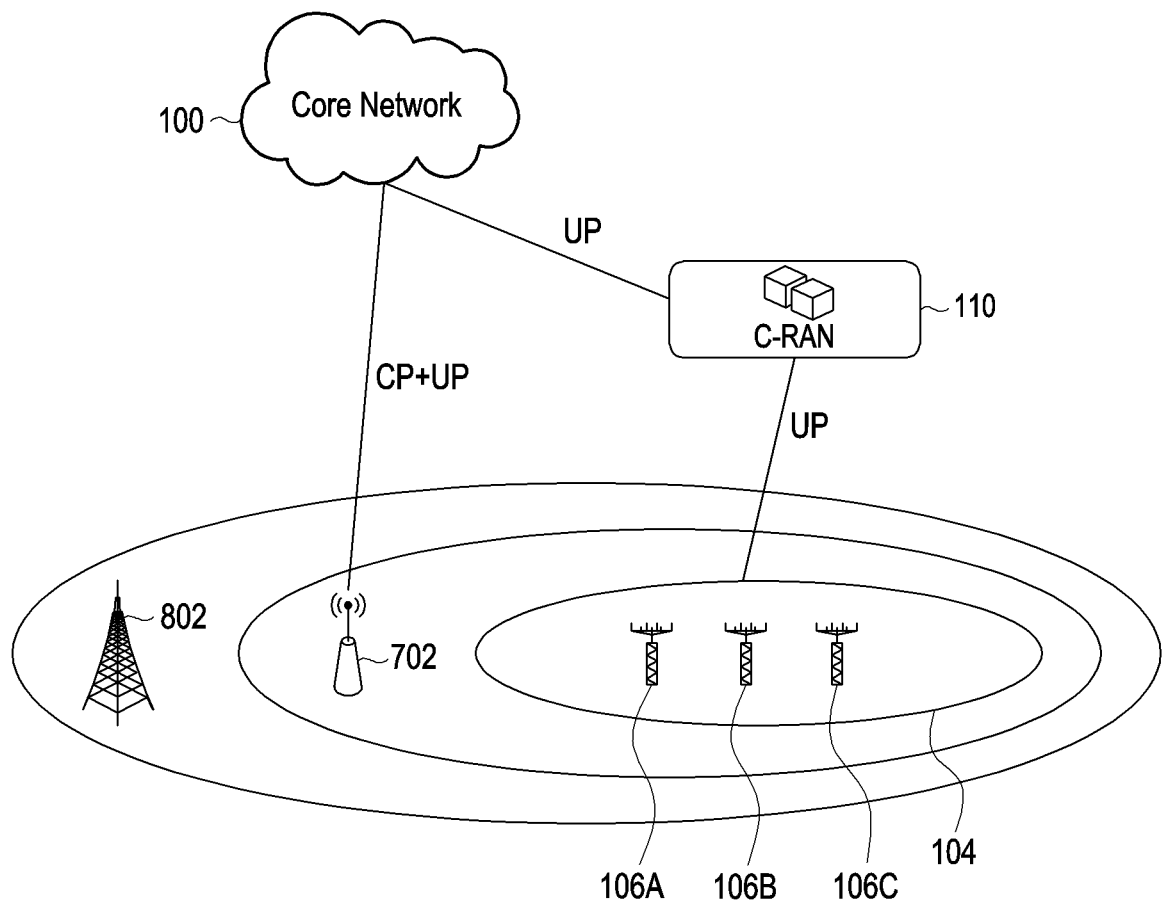
FIG. 8A illustrates a dual connectivity between mmW and THz band of the TRP system, according to an embodiment of the disclosure.

FIG. 8A illustrates a dual connectivity between mmW (802) and THz band, according to an embodiment of the disclosure.

Referring to FIG. 8A, the dual connectivity system where mmW (802) or any other low frequency RAT can be based on cellular system and high frequency RAT can be based on cell less system. The controller can then connect to 6G RAN which is further connected to the core network (101) of Master RAT. The C-plane connection exist with cellular system and data plane connection exist with both cellular and cell less system. The cellular and cell less RAT can be based on any technology which can be based on sub 6 GHz, mmW, high frequency of mmW, THz system, VLC system and the like. Any combination of the RATs is possible in the multi TRP system (100).

Figure 8B:
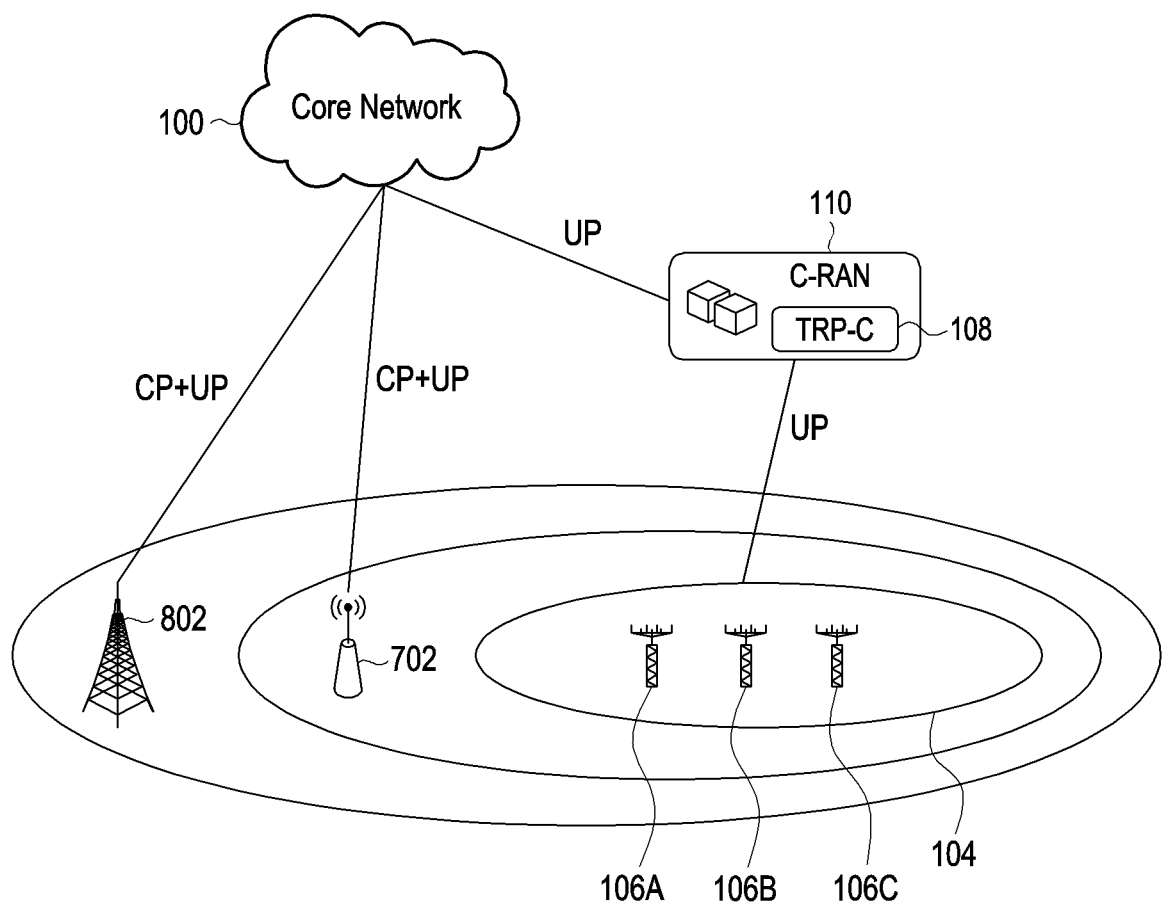
FIG. 8B illustrates a multi connectivity between mmW, high mmW and THz band of the TRP system, according to an embodiment of the disclosure.

FIG. 8B illustrates a multi connectivity between mmW, high frequency mmW (802) and THz band, according to an embodiment of the disclosure.

Referring to FIG. 8B, for example, consider a conventional scenario, the proposed scenario is based on current deployment where 5G are cellular deployments but 6G will be cell-less deployments. Multiple RATs have been involved for the multi TRP system (100) which is based on sub 6 GHz, mmW, high frequency of mmW, THz system, VLC system and the like. Although FIG. depicts 6G as cell less system but any combination of the RATs is possible to define the system. Three RATs say RAT A, B and C are needed to define multi connectivity system. There can be C-Plane connection between RAT A and RAT B and/or RAT A and RAT C and/or RAT B and RAT C or only with RAT A or RAT B or RAT C. There can be U-Plane connection between RAT A and RAT B and/or RAT A and RAT C and/or RAT B and RAT C. For cell less system, C-RAN (110) can have the TRP-C (108) functionality which will handle the multiple TRPs. The multiple TRPs can be separate module or part of C-RAN (110). All the RATs may not be active at the same time, Activation and Deactivation of RAT depends on data rate requirement, channel condition and the like.

Figure 9:
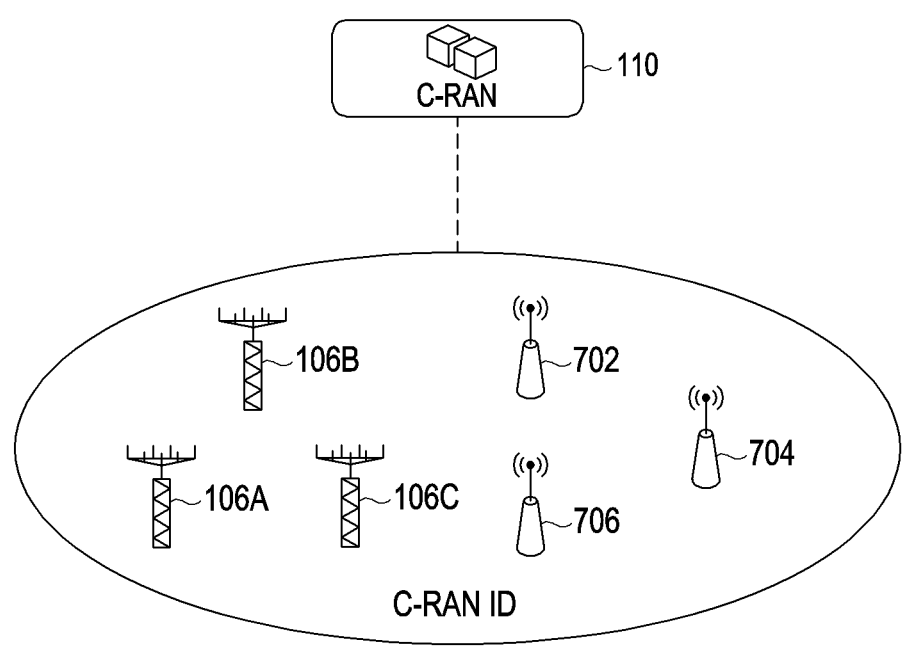
FIG. 9 illustrates a heterogeneous deployment of the of the TRP system, according to an embodiment of the disclosure.

FIG. 9 illustrates a heterogeneous deployment, according to an embodiment of the disclosure.

Referring to FIG. 9, for example, consider a conventional scenario, the proposed scenario is based on assumption that 5G and 6G both can support cell-less deployments. The C-RAN (110) controls multiple TRPs (106A-106C) and (702-706) which not only belongs to different frequency, band, but also different RAT. The allocation of TRP which can serve the UE (102) depends upon the type of services, need of data rate and UE capability. The UE (102) can move from one RAT to another RAT seamlessly.

Function and Role of TRP-C (108): The TRP-C (108) or RF controller or cell controller or RU controller or controller is new module which will control the multiple TRPs (106A-106N) and (702-706) under region or area or logical entity or cell areas defined by C-RAN (110) or CU or DU or any other network entity. The TRP-C (108) can be an independent network node. All TRPs in particular area or cell can be connected to TRP-C (108) through front haul optical fiber link or wireless link. TRP-C (108) can control one cell or area or multiple cells or area, which consist of multiple TRPs. TRP-C can be connected to C-RAN (110) or CU or DU or any other network entity through front haul or backhaul fiber or wireless link. The node can also co-exist with C-RAN (110) or CU or DU or any other core Entity. The TRP-C (108) can also be functionality or module or sub module in CU or DU or C-RAN (110) or any another network entity defined for 5G or 6G or any other wireless communication system. The UE (102) can either served with single or multiple TRPs with TRP set. The various functions or procedures performed by TRP-C (108) is mentioned below:

The handover procedure: The TRP-C (108) will be controlling multiple TRPs (106A-106N) and (702-706). The UE (102) can be served with one of the TRPs of the number of TRPs (106A-106N). The TRP-C (108) is able to understand the measurements which are sent by the UE (102). The TRP-C (108) have basic L1 functionality to handle the handover procedure. The TRP-C (108) is also able to configure DL RS signal, SSB and CSI configuration to the UE (102). The TRP-C (108) can take care of handover decision that changes of TRP based on measurement received from the UE (102) or any other device. TRP-C (108) can decide the TRP, which can serve the UE (102) based on load, congestion and the like. TRP-C (108) can decide set of TRP set for the user based on positions or location (for example GPS), signal strength, and load (no. of flows or users, traffic load). During error scenarios like deafness, blockage, RL failure and the like, the TRP-C (108) quickly sends the UE (102) details to a new TRP, which can serve the UE (102). The TRP-C (108) interacts with the C-RAN (110) for handling of UE (102) procedures or take decision of its own. The TRP-C (108) can inform the C-RAN (110) during failure cases like RL failure, RLC error etc. over the inter face defined between C-RAN (110) and TRP-C (108). if the TRP-C (108) part of existing network entity then it can inform the other entity as per existing procedures.

Decision of handover between cells which are control under same TRP-C (108) can be taken by the module itself. Alternatively, it can inform C-RAN (110) if it wants to change the cell. In case all TRPs are loaded or congested then TRP-C (108) should inform the C-RAN (110) to perform handover decision or it can inform the another TRP-C (108) which is control by same C-RAN (110) through Xx interface. The C-RAN (110) or new TRP-C can decide to assign new TRP to the user.

Beam Management: the TRP-C (108) should be able to handle intra and inter TRP beam management procedure based on measurements, channel state information etc. UE (102) can inform the intra or inter TRP beam measurements to the TRP-C (108) and on basis of that it should be able to take decision regarding the beam and informing the same to the UE (102).

Formation and Maintenance of TRP set: In Multi TRP per cell or cell free kind of system, user may be served with multiple TRP. Decision of serving the UE (102) with single TRP or Multiple TRP depends upon type of service, load, data rate requirement and UE (102) capability which includes support of no of RF chain that is RF capability, frequency bands, bandwidth etc. The C-RAN (110) can configure the TRP-C (108) with UE (102) capability information so that it can decided whether UE (102) can be configured with single TRP or cluster of TRPs. C-RAN (110) can also inform the TRP-C (108) about the type of service or data rate so that it can decide between single or multiple TRP configuration. The configurations can be either sent by TRP-C (108) itself to UE (102) or can be send through layer 2 or layer 3 message by C-RAN (110) or any module of network entity. The C-RAN (110) and TRP-C module can co-ordinate with each other and decide the parameters. The UE (102) in UE capability message can send the information like whether it can support cell less kind of system or it can support single or multiple TRP.

The role of TRP-C (108) is to create set of TRP set which can serve the user. The TRP set can be formed on basis of channel quality, CSI and the like. During initial cell selection, the UE (102) can be camped on specific TRP, based on that TRP, controller is aware what all other TRPs can serve the user. So that TRP set can be decided based on that. Network can also decide the TRP set based on location and position of the UE (102). The TRP set can be fixed or it can be dynamic which changes based on location and CSI information from the UE (102).

The TRP set can be configured to the user and can be disabled initially. Enabling and disabling of the TRPs in the TRP set or cluster depends upon various factors as discussed above like channel condition, QOS requirement etc. The other way could be is UE may not be aware about any set but all the TRPs within the set are serving the UEs.

Another method to form the TRP set can be based on uplink sounding reference signal or channel state information or uplink signals. During initial camping or after cell selection, UE (102) sent the uplink Sounding Reference Signal (SRS). Few of TRPs will receive the same and respond the uplink SRS to TRP-C (108). The TRP-C (108) can decide the set based on the response.

Another method to form the TRP set can be based on uplink sounding reference signal or channel state information or uplink signals. During initial camping or after cell selection, the UE (102) sends the uplink SRS to the multi TRP system (100). Few of TRPs will receive the same and respond it back to the UE (102) in form of some signature or with TRP-ID. The information can be received over physical common control channel. The UE (102) will then send the same signature in L1 or MAC level report and sent to the network. The network decides which TRPs can serve the UE (102). The network can also configure multiple CSI configuration specific to TRPs which can be associated with separate TRP. The UE (102) is to measure and report the physical measurement result (For example CQI, PMI) for selecting suitable active TRP set.

Another possible method for TRP set could be that UE (102) camped on the TRP and controller identifies which all other TRPs can serve the user. One of the TRP can be master TRP (PCell or P-TRP) and other TRPs are secondary TRP. Depending on UE capabilities, Secondary TRPs (SCells or S-TRP) can be configured to form together with the PCell a set of serving cells. The configured set of serving cells for the UE (102) therefore always consists of one PCell and one or more SCells. The reconfiguration, addition and removal of SCells can be performed by the TRP-C (108). During handover, beam change controller or RRC can also add, remove, or reconfigure SCells for usage with the target PCell. When adding a new SCell, dedicated RRC signaling or controller message based on L1 or Layer 2 is used for sending all required message. During any error scenario or poor channel quality issue P-TRP can be replaced with S-TRP. All control information can come through P-TRP that is the P-TRP carry all measurement reports and other data related control information.

The TRP-C (108) can maintain two types of cluster for each user. One is serving cluster: The serving cluster consists of information on all TRPs who are serving the user. Other is secondary cluster: The secondary cluster consists of information on all TRPs who are in the vicinity of the user and can serve the user if required. The TRP-C (108) can also add or remove or reconfigure the TRPs in TRP set. The TRP reconfiguration could be done based on measurement report, load condition and requirements for data rate and QOS. The measurement report can be received on the master TRP. It is also possible that instead of TRP-C (108), the master TRP decides that which other TRPs can serve the user. The operation, procedures defined above for TRP-C (108) will be applicable for TRP also. The controller can also accept or reject the commands sent by C-RAN (110) or UE (102).

In some embodiment, there can be multiple TRP-C under one Scheduling unit (DU or C-RAN (110)). In traditional network, the channel condition with respect to the serving node is transferred to the scheduling entity. In the case where multiple TRPs are involved in data transmission and reception or may be some of them or only single TRP is involved Scheduling entity is not aware about which TRPs are serving the UE (102) at particular instant of time as it may be changing very rapidly depending on various conditions. To provide the grants for particular user, network need to be aware about the current channel condition, so the TRP-C (108) can send the channel condition for master TRP or serving TRP or TRP with best serving condition or averaging the channel condition of all active TRPs. There is need to have tight coordination between the controller and scheduler so that it can provide it efficient grants to maintain desired data rates.

The C-RAN (110) or DU entity has already taken a decision about time and frequency allocation for the user. However, the TRP-C (108) is taking decision about which TRP should serve the user. If no TRP in the cluster can serve the user in the assigned time/frequency-slot then inform to C-RAN (110) or DU and ask to reschedule the packet. Buffer it at TRP-C (108) and send in the next possible slot, which can be fixed, or variable slot based on design. (Here the assumption is if user expecting something on assigned slot is not received due to blockage or anything then it can check in the immediate next slot or some fixed backup slot after n time slot.)

Beam search enhancements: During initial camping process, the UE (102) and network beams will be aligned to each other in particular direction. After the UE (102) may continue search for best beams which may belong to same or different TRP. The procedure can be time consuming and may impact the battery consumption of the devices due to search of large no of beams. To reduce the TRP-C (108) can predict the beams or sectors where there are high chances of beam alignment between user and network. Once controller know the location of the user based on initial cell selection or search or reports, it can determine the sector and direction where there are high chances of detection of best beams. It can narrow down the list of beams for all TRP within vicinity and can share the list with corresponding TRPs or the UE (102). Controller can maintain a list of serving node for each user and can derive the possible list of beams/sector from other TRPs. All functionality defined for the TRP-C (108) is applicable for TRP or C-RAN (110). All functionality defined for TRP is applicable for TRP-C (108) or C-RAN (110). All functionality defined for C-RAN (110) is applicable for C-RAN (110) is applicable for TRP-C (108) or TRP.

Interaction between two TRP-C: As shown in deployment architecture, there is a possibility that two controllers can interact with each other, which is controlled by same C-RAN entity or different C-RAN entity. There is need to have coordination between the two controllers if they are serving the same set of devices say during addition of TRPs or modifying the TRPs in TRP set. Both the controller should be aware of UE capability and should interact with each while addition or deletion of TRP in the TRP set and also inform each other when they are modifying the TRPs. The TRPs can also interact with each other through CU or DU or C-RAN (110). If both controllers are in agreement then only specific TRP-C (108) should take decision. All the procedures which are defined between two DU entity or two CU entity for 5G system are applicable between the two controllers also. If any error occurs say RLF then they can report to C-RAN (110) and at the same time can inform the other controller also so that services can be suspended or stopped. There is also case where one of controller can act as Master node and another act as secondary node. The decision of master controller depends upon C-RAN (110) or whoever has initiated the connection with UE (102) that is who is having master TRP. The master TRP can be changed during reconfiguration based on load, measurements or C-RAN decision.

Interaction between controller, C-RAN (110) and UE (102) for maintaining the serving TRP set: Network (TRP-C) (108)/Master TRP can initiates the node or TRP addition request during poor connection with the existing nodes or availability of more RF chains or to boost the data-rates or to meet the QoS requirements. Once UE establish the connection with TRP, it reports the TRP ID, Sector #, UE #/C-RNTI to TRP-C or C-RAN (110) or CPU. The TRP-C (108) responds the same with possible sectors for UE for new node along with the timestamp (timestamp indicates from when to look for new node) to the TRP which it is camped and it further shares the information with the UE (102). The information helps the UE to look into specific sectors and specific time stamp. The TRP-C (108) also sends the Sector list and UE #/C-RNTI along with timestamp to the TRPs to make the connection with UE. Both UE and TRPs follow the timestamp and try to align with each other. Once beam alignment is done, the data transmission continuous. If dedicated sectors are not provided by TRP-C (108) then it can be exhaustive search at TRP/UE, but the sequence of events/procedure is same. The same procedure can be initiated by TRP-C (108) also or C-RAN (110) also once initial connection with UE is established. The decision of which TRPs can serve the UE can be based on DL-RS, SSB or can based on UL SRS received by serving TRP. If it's based on UL SRS or CSI then it will report the TRPs along with signal quality to TRP-C (108) so that it can take decision Another method is the UE (102) can also suggest or initiate the TRP addition procedure. UE sends Node addition/cluster formation request along with information of how many connection the UE (102) wants which can be based on (min(detected nodes, max RF chains) Or min(Need, max RF chains). Based on UE request master node sends request to CPU/TRP-C.-TRP ID, Sector #, UE #/C-RNTI, Conn. #.TRP-C sends the ACK (Accept(Sector #)/Reject) with possible TRP list to the UE via master TRP. TRP-C sends the Sector list and UE #/C-RNTI to the TRPs for connection est. to all the new TRPs in the cluster. Once beam alignment is done, the data transmission continuous.

Network or CPU or TRP-C (108) initiates the node deletion request in any of the condition like poor connection with the node, Load balancing, Front haul bottle neck, Availability of better node, Node not required anymore (fulfilling QoS or data rates). TRP-C (108) decides the node which need to be removed from the TRP set and informs the master as well as other nodes which need to be removed. It also sends the command to UE (102) to remove the nodes and continues with data transmission, once the procedure is completed. CPU or TRP-C Sends node deletion request to the Master node or targeted node with the information like [Master Node] TRP ID, Sector #, UE #/C-RNTI, [Targeted Node] UE #/C-RNTI, Sector #. Then the deletion request is forwarded to the UE from the TRP. Accordingly the ACK is send by to the CPU or TRP-C. Node deletion initiation can be through targeted node or TRP or master node or TRP. The same procedure can be initiated by UE also where it can request the network to remove the nodes. The change of master node can also follow the same procedures as defined above.

Figure 10:
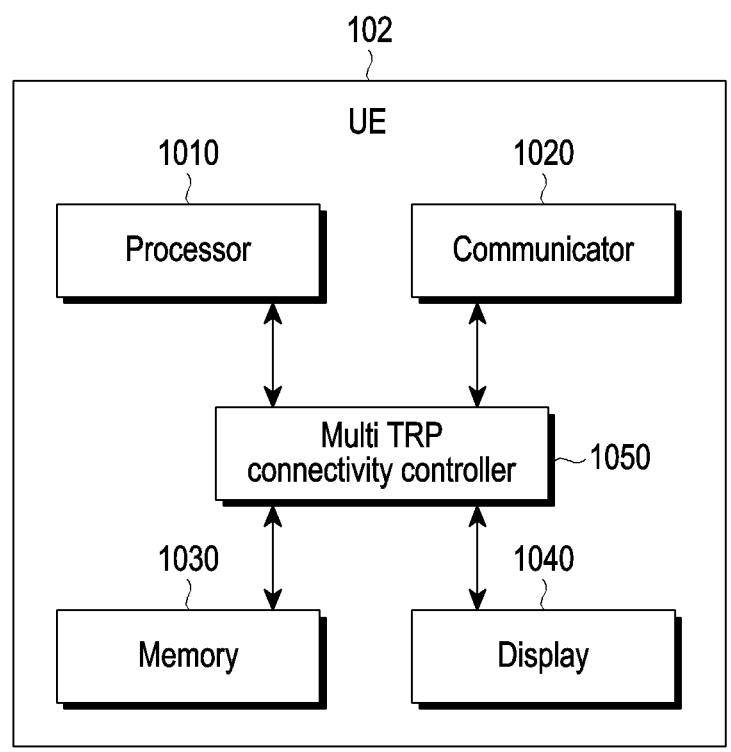
FIG. 10 shows various hardware components of a UE which is required in order to communicate with the multi TRP system, according to an embodiment of the disclosure.

FIG. 10 shows various hardware components of the UE (102) which is required in order to communicate with the multi TRP system (100), according to an embodiment of the disclosure.

Referring to FIG. 10, the UE (102) may be, for example, but not limited to a cellular phone, a smart phone, a Personal Digital Assistant (PDA), a tablet computer, a laptop computer, a smart social robot, a smart watch, a music player, a video player, an Internet of things (IoT) device or the like.

The UE (102) includes a processor (1010), a communicator (1020), a memory (1030), a display (1040), and a multi TRP connectivity controller (1050). The processor (1010), and the multi TRP connectivity controller (1050), coupled to the memory (1030) and the processor (1010) is configured to receive the cell information associated with the cell topology from the TRP-C (108). The UE (102) is further configured to perform a handover procedure, a beam management, formation of clusters or identifying the TRPs to serve users, addition and deletion of the TRPs in a cluster based on the cell information associated with the cell topology.

The UE (102) is further configured to receive from the TRP-C (108) one of the CSI configuration of the specific beam formed by each of the TRP (106A), the unique sequence signature for each of the specific beam formed by each of the TRP (106A), and the unique beam ID associated with each of the specific beam formed by each of the TRP (106A). The UE (102) is further configured to measure and report the specific beam formed by each of the TRP (106A) based on one of the CSI configuration of the specific beam formed by each of the TRP (106A), the unique sequence signature for each of the specific beam formed by each of the TRP (106A), and the unique beam ID associated with each of the specific beam formed by each of the TRP (106A).

The multi TRP connectivity controller (1050) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The multi TRP connectivity controller (1050) may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block.

The processor (1010) is configured to execute instructions stored in the memory (1030) and to perform various processes. The processor (1010) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (1010) may include multiple cores and is configured to execute the instructions stored in the memory (1030).

The memory (1030) also stores instructions to be executed by the processor (1010). The memory (1030) stores information on the plurality of cells, the number of TRPs, and the cell topology information on the handover procedure, the beam management, the formation of clusters or the identifying the TRPs to serve users, the addition and deletion of the TRPs in the cluster. The memory (1030) also stores information on the cell identifiers.

The memory (1030) may include non-volatile storage elements. In addition, the memory (1030) may, in some examples, be considered a non-transitory storage medium. The term "non-transitory" may indicate that the storage medium is not embodied in a carrier wave or a propagated signal. However, the term "non-transitory" should not be interpreted that the memory (1030) is non-movable. In some examples, the memory (1030) can be configured to store larger amounts of information. In certain examples, a non-transitory storage medium may store data that can, over time, change (e.g., in Random Access Memory (RAM) or cache).

Further, the UE (102) also comprises memory core, which may include one or more banks, arrays, and/or other organization of the memory cells, e.g., designed using Flash memory technology such as NAND Flash memory cells.

The various hardware or software components allow the UE (102) to communicate with the multi TRP system (100) configured in the core network (101) or the cloud network or the virtual network or to at least one TRP (106A) of the number of TRPs in each cell of the plurality of cells. The processor (910) is capable of processing next wireless communication signals Although the FIG. 10 shows various hardware components of the UE (102) but it is to be understood that other embodiments are not limited thereon. In other embodiments, the UE (102) may include less or a greater number of components. Further, the labels or names of the components are used only for illustrative purpose and does not limit the scope of the disclosure. One or more components can be combined together to perform same or substantially similar function of the multi TRP connectivity controller (950).

Figure 11:
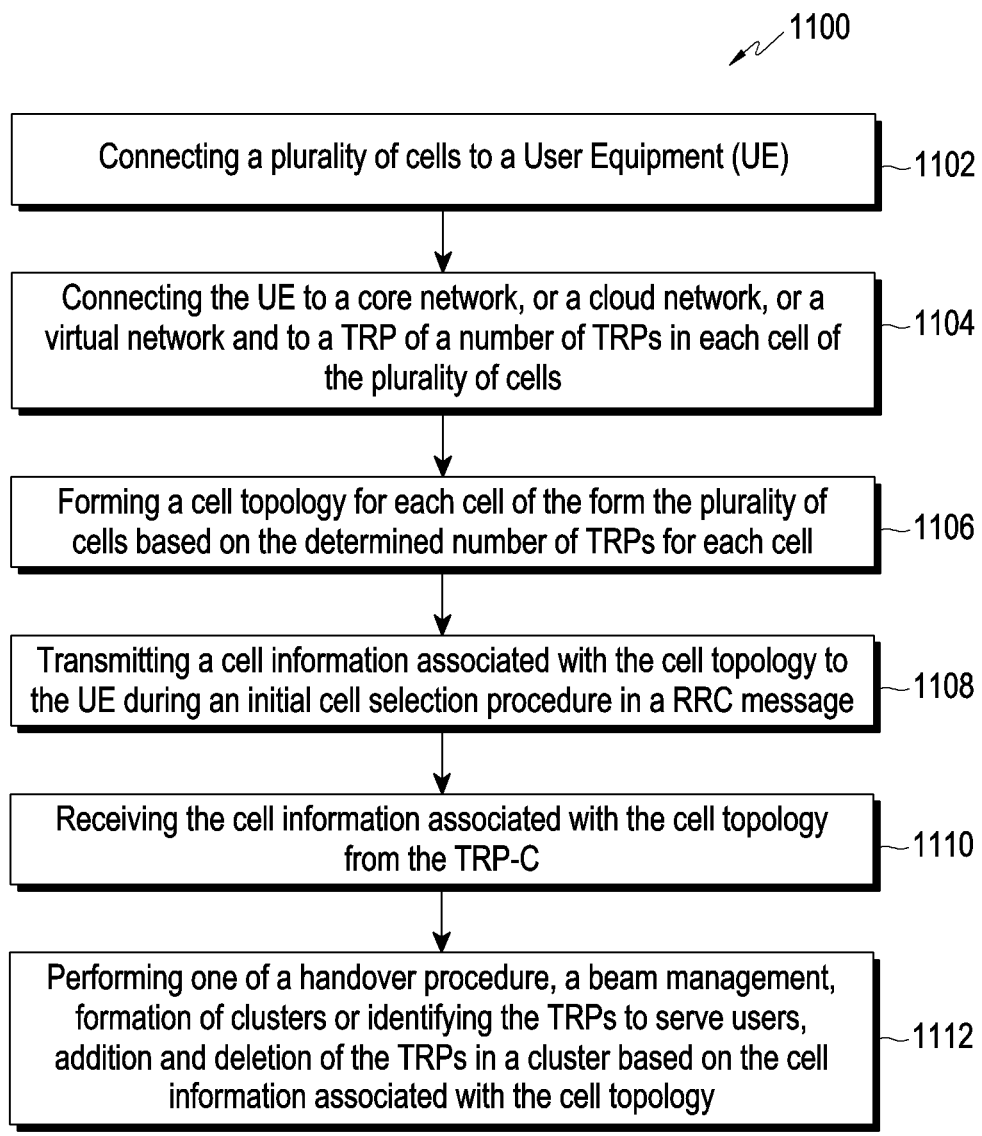
FIG. 11 illustrates a method for implementing a multi Transmission Reception Point (TRP) system using the TRP-C, according to an embodiment of the disclosure.

FIG. 11 illustrates a method (1100) for implementing the multi TRP system (100) using the TRP-C (108), according to an embodiment of the disclosure.

At operation 1102, the method (1100) includes connecting the plurality of cells to the UE (102). At operation 1004, the method (1100) includes connecting the UE (102) to the core network (101) and to the TRP (106A) of the number of TRPs in each cell of the plurality of cells. At operation 1106, the method (1100) includes forming the cell topology for each cell of the form the plurality of cells based on the determined number of TRPs for each cell. At operation 1108, the method (1100) includes transmitting the cell information associated with the cell topology to the UE (102) during an initial cell selection procedure in an RRC message. At operation 1110, the method (1100) includes receiving the cell information associated with the cell topology from the TRP-C. At operation 1112, the method (1100) includes performing at least one of the handover procedure, a measurement procedure, a cell reselection procedure, and decoding of data based on the cell information associated with the cell topology.

Figure 12:
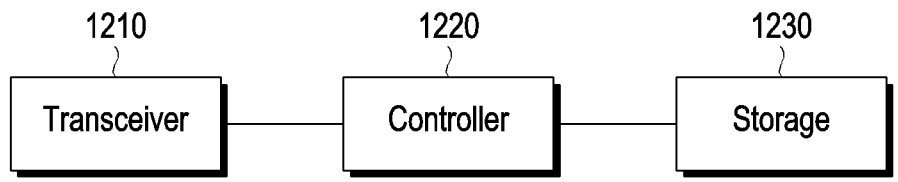
FIG. 12 illustrates a block diagram of a UE according to an embodiment of the disclosure.

FIG. 12 illustrates a block diagram of a UE according to an embodiment of the disclosure.

Referring to FIG. 12, the UE may include a transceiver 1210, a controller 1220, and storage 1230. In the present disclosure, the controller 1220 may include a circuit, an ASIC, or at least one processor.

The transceiver 1210 may transmit and receive signals to and from a base station or another network entity.

The controller 1220 may control the overall operation of the network entity according to an embodiment. For example, the controller 1220 may control the signal flow to perform the operations in FIGS. 1-11 described above.

In an embodiment, the controller 1220 may receive the cell information associated with the cell topology from the TRP-C entity, and perform at least one of a handover procedure, a beam management, formation of clusters or identifying the TRPs to serve users, addition and deletion of the TRPs in a cluster based on the cell information associated with the cell topology.

In an embodiment, the controller 1220 may receive a primary synchronization signal (PSS) or a secondary synchronization signal (SSS) from the TRP-C, decode the PSS or the SSS based on the received cell information associated with the cell topology when the received cell information indicates one of a common cell identifier for all TRPs available in each cell with separate TRP identifier for each of the TRPs in each of the cell by decoding a ternary synchronization signal (TSS), and a separate TRP identifier for each of the TRPs in each cell without a common cell identifier for all TRPs available in each cell, decode TSS to obtain at least one of a TRP identifier associated with the TRP identifier and the common cell identifier, and perform a cell selection based on at least one of the obtained TRP identifier and the obtained common cell identifier.

In an embodiment, the controller 1220 may receive, from the TRP-C entity, one of the CSI configuration of the specific beam formed by each of the at least one TRP, the unique sequence signature for each of the specific beam formed by each of the at least one TRP, and the unique beam identifier associated with each of the specific beam formed by each of the at least one TRP; and measure and report the specific beam formed by each of the at least one TRP based on one of the CSI configuration of the specific beam formed by each of the at least one TRP, the unique sequence signature for each of the specific beam formed by each of the at least one TRP, and the unique beam identifier associated with each of the specific beam formed by each of the at least one TRP.

The storage 1230 may store at least one of information exchanged through the transceiver 410 and information generated by the controller 430.

Figure 13:
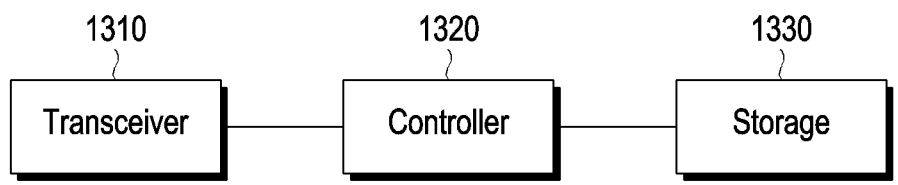
FIG. 13 illustrates a block diagram of a base station according to an embodiment of the disclosure.

FIG. 13 illustrates a block diagram of a base station according to an embodiment of the disclosure.

Referring to FIG. 13, the base station may include a transceiver 1310, a controller 1320, and storage 1330. In the present disclosure, the controller 1320 may include a circuit, an ASIC, or at least one processor.

The transceiver 1310 may transmit and receive signals to and from a terminal (UE) or another network entity.

The controller 1320 may control the overall operation of the network entity according to an embodiment. For example, the controller 1320 may control the signal flow to perform the operations in FIGS. 1-11 described above.

The storage 1330 may store at least one of information exchanged through the transceiver 1310 and information generated by the controller 1330.

Figure 14:
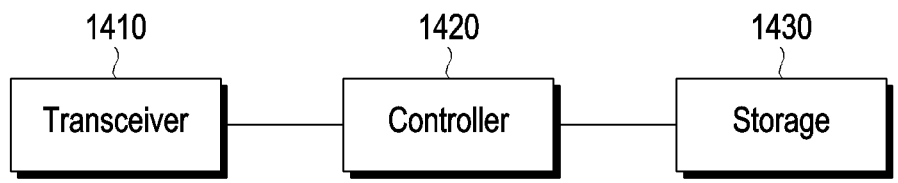
FIG. 14 illustrates a block diagram of a network entity according to an embodiment of the disclosure.

FIG. 14 illustrates a block diagram of a network entity according to an embodiment of the disclosure. The network entity (node) may correspond to one of the network entities shown in FIGS. 1-11. For example, the network entity may be TRP-C shown in FIGS. 1-11.

Referring to FIG. 14, the network entity may include a transceiver 1410, a controller 1420, and storage 1430. In the present disclosure, the controller 1420 may include a circuit, an ASIC, or at least one processor.

The transceiver 1410 may transmit and receive signals to and from a terminal (UE) or another network entity.

The controller 1420 may control the overall operation of the network entity according to an embodiment. For example, the controller 1420 may control the signal flow to perform the operations in FIGS. 1-11 described above.

In an embodiment, the controller 1420 may connect a plurality of cells to a User Equipment (UE); and determine a number of TRPs for each cell of the plurality of cells to serve the UE, wherein the TRP-C entity is connected to a core network, the core network being defined by a centralized or cloud radio access network (C-RAN). In an embodiment, the controller 1420 may form a cell topology for each cell of the plurality of cells based on the determined number of TRPs for each cell, and transmit cell information associated with the cell topology to the UE during an initial cell selection procedure in a radio resource control (RRC) message, and wherein the cell information comprises one of a common cell identifier for all TRPs available in each cell without TRP identifier for each of the TRPs in each cell, a common cell identifier for all TRPs available in each cell with separate TRP identifier for each of the TRPs in each cell, and a separate TRP identifier for each of the TRPs in each cell without a common cell identifier for all TRPs available in each cell.

The storage 1430 may store at least one of information exchanged through the transceiver 1410 and information generated by the controller 1430.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A transmission reception point (TRP) controller (TRP-C) entity in a TRP system, the TRP-C entity comprising:
a transceiver;
a processor coupled with the transceiver; and
memory storing instructions that, when executed by the processor, cause the TRP-C entity to:
connect a plurality of cells to a User Equipment (UE),
determine a number of TRPs for each cell of the plurality of cells to serve the UE, and
form a cell topology for each cell of the plurality of cells based on the determined number of TRPs for each cell,
wherein the TRP-C entity is connected to a core network, the core network being defined by a centralized or cloud radio access network (C-RAN).

2. The TRP-C entity as claimed in claim 1,
wherein the instructions cause the TRP-C entity to
transmit cell information associated with the cell topology to the UE during an initial cell selection procedure in a radio resource control (RRC) message, and
wherein the cell information comprises one of a common cell identifier for all TRPs available in each cell without TRP identifier for each of the TRPs in each cell, a common cell identifier for all TRPs available in each cell with separate TRP identifier for each of the TRPs in each cell, or a separate TRP identifier for each of the TRPs in each cell without a common cell identifier for all TRPs available in each cell.

3. The TRP-C entity as claimed in claim 2,
wherein the common cell identifier comprises one of a THz Cell identifier comprising multiple TRPs, a common C-RAN identifier, a central unit (CU) identifier, a distributed unit (DU) identifier, or a TRP identifier, and
wherein the common C-RAN identifier, the CU identifier and the DU identifier are decoded during cell selection by the UE.

4. The TRP-C entity as claimed in claim 2,
wherein the instructions cause the TRP-C entity to:
receive the cell information associated with the cell topology from the TRP-C entity,
perform at least one of a handover procedure, a beam management, formation of clusters or identifying the TRPs to serve users, or addition and deletion of the TRPs in a cluster based on the cell information associated with the cell topology, and
perform a cell reselection procedure based on the cell information, and
wherein, to perform the cell reselection procedure based on the cell information, the UE is further configured to:
receive a primary synchronization signal (PSS) or a secondary synchronization signal (SSS) from the TRP-C entity,
decode the PSS or the SSS based on the received cell information associated with the cell topology when the received cell information indicates one of a common cell identifier for all TRPs available in each cell with separate TRP identifier for each of the TRPs in each of the cell by decoding a ternary synchronization signal (TSS), or a separate TRP identifier for each of the TRPs in each cell without a common cell identifier for all TRPs available in each cell,
decode TSS to obtain at least one of a TRP identifier associated with the TRP identifier or the common cell identifier, and
perform a cell selection based on at least one of the obtained TRP identifier or the obtained common cell identifier.

5. The TRP-C entity as claimed in claim 1, wherein the TRP-C entity is further configured to:
form a specific beam using at least one TRP of the number of TRPs in each cell; and
transmit to the UE one of:
a channel state information (CSI) configuration of the specific beam formed by each of the at least one TRP to enable the UE to measure and report specific beams,
a unique sequence signature for each of the specific beam formed by each of the at least one TRP to enable the UE to measure and report the specific beams, or
a unique beam identifier associated with each of the specific beam formed by each of the at least one TRP to enable the UE to measure and report the specific beams.

6. The TRP-C entity as claimed in claim 5, wherein the UE is configured to:
receive, from the TRP-C entity, one of the CSI configuration of the specific beam formed by each of the at least one TRP, the unique sequence signature for each of the specific beam formed by each of the at least one TRP, or the unique beam identifier associated with each of the specific beam formed by each of the at least one TRP; and
measure and report the specific beam formed by each of the at least one TRP based on one of the CSI configuration of the specific beam formed by each of the at least one TRP, the unique sequence signature for each of the specific beam formed by each of the at least one TRP, or the unique beam identifier associated with each of the specific beam formed by each of the at least one TRP.

7. The TRP-C entity as claimed in claim 1, wherein each TRP is composed of one or more antennas enabling multiple beams to be formed for serving the UE.

8. The TRP-C entity as claimed in claim 1,
wherein the TRP-C entity is further configured to cluster the number of TRPs within each cell into one of a serving cluster or a secondary cluster,
wherein the serving cluster comprises a TRP which is currently serving the UE, and
wherein the secondary cluster comprises a TRP in a vicinity of the UE which is not currently serving the UE.

9. The TRP-C entity as claimed in claim 1,
wherein the instructions cause the TRP-C entity to configure at least one TRP within each cell into one of a dynamic TRP set or a fixed TRP set,
wherein the dynamic TRP set is configured based on at least one of a channel quality associated with the UE, an uplink sounding reference signal, a channel state information of the UE, a location of the UE, or a position of the UE.

10. The TRP-C entity as claimed in claim 1,
wherein the instructions cause the TRP-C entity to:
add or delete nodes in the core network, and
switch between master nodes, and
wherein the adding or deleting nodes in the core network and the switching between master nodes is based on at least one of UE vicinity to the nodes, a measurement report from the UE, a poor connection with an existing nodes, availability of Radio Frequency (RF) chains, to boost data rates or to meet quality of service (QOS) requirements of network coverage.

11. A method of transmission reception point (TRP) controller (TRP-C) entity in a multi TRP system, the method comprising:
connecting a plurality of cells to a User Equipment (UE);
determining a number of TRPs for each cell of the plurality of cells to serve the UE; and
forming a cell topology for each cell of the plurality of cells based on the determined number of TRPs for each cell,
wherein the TRP-C entity is connected to a core network, the core network being defined by a centralized or cloud radio access network (C-RAN).

12. The method as claimed in claim 11, further comprising:
transmitting cell information associated with the cell topology to the UE during an initial cell selection procedure in a radio resource control (RRC) message,
wherein the cell information comprises one of a common cell identifier for all TRPs available in each cell without TRP identifier for each of the TRPs in each cell, and a common cell identifier for all TRPs available in each cell with separate TRP identifier for each of the TRPs in each cell, or a separate TRP identifier for each of the TRPs in each cell without a common cell identifier for all TRPs available in each cell.

13. The method as claimed in claim 12,
wherein the common cell identifier comprises one of a THz Cell identifier comprising multiple TRPs, a common C-RAN identifier, a central unit (CU) identifier, distributed unit (DU) identifier, or a TRP identifier, and
wherein the common C-RAN identifier, the CU identifier and the DU identifier is decoded during cell selection by the UE.

14. The method as claimed in claim 12, further comprising:
receiving, by the UE, the cell information associated with the cell topology from the TRP-C entity;
performing, by the UE, at least one of a handover procedure, a beam management, formation of clusters or identifying the TRPs to serve users, or addition and deletion of the TRPs in a cluster based on the cell information associated with the cell topology; and
performing of a cell reselection procedure based on the cell information,
wherein the performing of the cell reselection procedure based on the cell information comprises:
receiving a primary synchronization signal (PSS) or a secondary synchronization signal (SSS) from the TRP-C entity,
decoding the PSS or the SSS based on the received cell information associated with the cell topology when the received cell information indicates one of a common cell identifier for all TRPs available in each of the cell with separate TRP identifier for each of the TRPs in each of the cell, or a separate TRP identifier for each of the TRPs in each of the cell without a common cell identifier for all TRPs available in each of the cell,
decoding ternary synchronization signal (TSS) to obtain at least one of a TRP identifier associated with the TRP identifier or the common cell identifier, and
performing a cell selection based on at least one of the obtained TRP identifier or the obtained common cell identifier.

15. The method as claimed in claim 11, further comprising:
forming specific beam using at least one TRP of the number of TRPs in each cell; and
transmitting to the UE one of:
a channel state information (CSI) configuration of the specific beam formed by each of the at least one TRP to enable the UE to measure and report the specific beams,
a unique sequence signature for each of the specific beam formed by each of the at least one TRP to enable the UE to measure and report the specific beams, or
a unique beam identifier associated with each of the specific beam formed by each of the at least one TRP to enable the UE to measure and report the specific beams.

16. The method as claimed in claim 15, further comprising:
receiving, by the UE from the TRP-C entity, one of the CSI configuration of the specific beam formed by each of the at least one TRP, the unique sequence signature for each of the specific beam formed by each of the at least one TRP, or the unique beam identifier associated with each of the specific beam formed by each of the at least one TRP; and
measuring and reporting, by the UE, the specific beam formed by each of the at least one TRP based on one of the CSI configuration of the specific beam formed by each of the at least one TRP, the unique sequence signature for each of the specific beam formed by each of the at least one TRP, or the unique beam identifier associated with each of the specific beam formed by each of the at least one TRP.

17. The method as claimed in claim 11, wherein each TRP is composed of one or more antennas enabling multiple beams to be formed for serving the UE.

18. The method as claimed in claim 11, further comprising:
   clustering the number of TRPs within each cell into one of a serving cluster or a secondary cluster,
   wherein the serving cluster comprises a TRP which is currently serving the UE, and
   wherein the secondary cluster comprises a TRP in a vicinity of the UE which is not currently serving the UE.

19. The method as claimed in claim 11, further comprising:
   configuring at least one TRP within each cell into one of a dynamic TRP set or a fixed TRP set,
   wherein the dynamic TRP set is configured based on at least one of a channel quality associated with the UE, an uplink sounding reference signal, a channel state information of the UE, a location of the UE, or a position of the UE.

20. The method as claimed in claim 11, further comprising:
   adding or deleting nodes in the core network, and
   switching between master nodes,
   wherein the adding or deleting nodes in the core network and the switching between master nodes is based on at least one of UE vicinity to the nodes, a measurement report from the UE, a poor connection with an existing nodes, availability of radio frequency (RF) chains, to boost data rates or to meet quality of service (QOS) requirements of network coverage.

\* \* \* \* \*